US009211656B2

(12) United States Patent
Prochello et al.

(10) Patent No.: US 9,211,656 B2
(45) Date of Patent: Dec. 15, 2015

(54) SYSTEM AND METHOD OF REMOVING BEADS FROM TIRES

(71) Applicant: Eagle International, LLC, Dakota Dunes, SD (US)

(72) Inventors: Julie K. Prochello, Dakota Dunes, SD (US); Les Pederson, Dakota Dunes, SD (US); Joe Brehmer, Lyons, NE (US)

(73) Assignee: EAGLE INTERNATIONAL, LLC, Dakota Dunes, SD (US)

( * ) Notice: Subject to any disclaimer, the term of this patent is extended or adjusted under 35 U.S.C. 154(b) by 9 days.

(21) Appl. No.: 14/156,046

(22) Filed: Jan. 15, 2014

(65) Prior Publication Data
US 2014/0196852 A1    Jul. 17, 2014

Related U.S. Application Data

(60) Provisional application No. 61/752,882, filed on Jan. 15, 2013.

(51) Int. Cl.
*B32B 38/10*    (2006.01)
*B29B 17/02*    (2006.01)
*B29L 30/00*    (2006.01)

(52) U.S. Cl.
CPC ........... *B29B 17/02* (2013.01); *B29B 2017/022* (2013.01); *B29L 2030/00* (2013.01); *Y02W 30/622* (2015.05); *Y02W 30/68* (2015.05); *Y10S 156/928* (2013.01); *Y10S 156/939* (2013.01); *Y10T 156/11* (2015.01); *Y10T 156/1184* (2015.01); *Y10T 156/19* (2015.01); *Y10T 156/1967* (2015.01)

(58) Field of Classification Search
CPC ................... Y10T 156/1179; Y10T 156/1184; Y10T 156/1961; Y10T 156/1967; Y10S 156/928; Y10S 156/939; B29B 2017/022
See application file for complete search history.

(56) References Cited

U.S. PATENT DOCUMENTS

| | | | | | |
|---|---|---|---|---|---|
| 3,838,492 | A | * | 10/1974 | Uemura | 29/403.3 |
| 4,873,759 | A | * | 10/1989 | Burch | 29/700 |
| 5,319,834 | A | * | 6/1994 | Voigts | 29/426.4 |
| 5,675,882 | A | * | 10/1997 | Hunt et al. | 29/426.3 |
| 5,783,035 | A | * | 7/1998 | Pederson | 156/763 |
| 6,249,949 | B1 | * | 6/2001 | Cross et al. | 29/426.4 |
| 2013/0205963 | A1 | * | 8/2013 | Prochello et al. | 83/36 |

* cited by examiner

*Primary Examiner* — Mark A Osele
(74) *Attorney, Agent, or Firm* — Perkins Coie LLP

(57) ABSTRACT

A system and method for removing steel beads from large diameter tires by lifting a tire into a position adjacent an extraction hook and a pair of stripping dyes. The hook is positioned adjacent the tire bead and is then withdrawn through a narrow opening in the stripping dyes, which removes the bead from the tire. The machine is capable of removing both rubber-encased inner beads from the tire without repositioning the tire within the system. A plurality of lifting platforms position the tire and the stripping mechanisms with respect to one another throughout the extraction process.

23 Claims, 18 Drawing Sheets

SYSTEM AND METHOD OF REMOVING BEADS FROM TIRES

CROSS-REFERENCE TO RELATED APPLICATION(S)

This application claims the benefit of U.S. Provisional Patent Application No. 61/752,882, filed Jan. 15, 2013, which is incorporated herein by reference in its entirety for all purposes.

BACKGROUND

Off-the-road (OTR) tires include tires for construction vehicles such as wheel loaders, backhoes, graders, trenchers, and the like; as well as large mining trucks. OTR tires can be of either bias or radial construction although the industry is trending toward increasing use of radial. Bias OTR tires are built with a large number of reinforcing plies to withstand severe service conditions and high loads.

Disposal of large diameter OTR tires used in construction and mining is a growing, global concern. The physical properties of OTR tires differ significantly from passenger and truck tires, and require specialized processes to ensure a safe and cost-effective means to reduce the overall mass to a workable size for further processing. For perspective, a typical truck tire may weigh one hundred thirty pounds and measure forty two inches in diameter. However, a typical OTR tire weighs around seven thousand pounds and measures nearly twelve feet in diameter. OTR tires also have large steel beads disposed within the edges of the central tire openings that provide stability to the sidewalls and seal the tire to the rim.

The large steel beads in OTR tires represent a distinct problem for tire recyclers. There are some tire shredding machines capable of cutting through these large beads; however, this significantly increases the wear and maintenance costs of the equipment. By removing the bead prior to shredding, tire recyclers are able to reduce these costs and increase the life of their equipment.

Previous owners of scrapped OTR tires face a different problem. Many do not want the tires to be repaired and re-used in order to mitigate potential liability that could arise over defective tires. Most damaged OTR tires can be repaired as long as the casing and bead are still in reasonably good condition. Occasionally, tires will be repaired and resold without the prior owner's knowledge. However, an OTR tire cannot be repaired if the bead has been removed. Accordingly, a cost effective method of removing the beads from OTR tires would be desirable to owners of scrapped OTR tires who do not want the tires to be repaired or reused. Presently, there are no machines on the market that are capable of removing the whole bead from an OTR tire.

SUMMARY

This Summary is provided to introduce a selection of concepts in a simplified form that are further described below in the Detailed Description. This Summary, and the foregoing Background, is not intended to identify key aspects or essential aspects of the claimed subject matter. Moreover, this Summary is not intended for use as an aid in determining the scope of the claimed subject matter.

A large Tire Bead Removal Machine of the present technology is used to remove steel beads from large diameter tires (OTR tires). The tire debeading system generally includes a frame base that is angularly disposed to provide a horizontal frame portion and a vertical frame portion. A tire lift is coupled with a distal end portion of the horizontal frame portion. In various embodiments, the tire lift includes a tire receiving platform. The tire lift, in a horizontally disposed position, can receive a tire such that a sidewall of the tire rests against the tire lift. One or more power cylinders may be actuated to lift the tire from the horizontal position to a generally vertical position. A tire support is operatively coupled with the tire lift. The tire receiving platform is configured to support the weight of a tire when the tire lift is in the vertical position. The tire support extends from an end portion of the tire lift in an angular manner. In this configuration, the tire support serves as a backstop to stop horizontal movement of a tire as it is being loaded into the tire debeading system. In various embodiments, a tire cage is operatively coupled with the tire lift and tire support. The tire cage includes a pair of opposing arms that are pivotally coupled with the tire support. The arms are each angularly or arcuately shaped to approximate the curved periphery (tread surface). The arms are pivotally coupled with the tire support or tire lift. In this configuration, the arms of the tire cage may pivot toward and away from one another in a pinching action to firmly "grip" tires of various sizes during debeading operations.

In various embodiments, a stripping system lift is operatively coupled with the base frame, adjacent its vertical frame portion. The stripping system lift includes a lifting platform that, in some embodiments, is selectively, vertically, positionable with respect to the base frame. One or more lower lifting arms are pivotably coupled, at their opposite ends, with the lifting platform and base frame, respectively. One or more upper lifting arms are pivotably coupled, at their opposite ends, with the lifting platform and base frame, respectively. One or more power cylinders may be coupled with the base frame and the one or more lower lifting arms to create selective, vertical movement of the stripping system lift.

An extendable hook arm is supported by the lift platform. In various embodiments, a forward end portion of the hook arm is provided with a hook end portion having a sharpened edge directed toward a rearward end of the bead removing system. A hook extension power cylinder may be operatively coupled with the hook arm, so that the hook arm may be selectively extended and refracted with respect to the lift platform. In some embodiments, the hook arm may be operatively coupled with one or more extension arms for further, selective, reciprocal movement of the hook arm.

In various embodiments, a pair of opposing stripping dyes are positioned to extend transversely across the lifting platform, at its forward end portion. The stripping dyes are coupled with the lifting frame so they may be selectively moved toward and away from one another. The stripping dyes are provided with hook notches, which are open to one peripheral edge of each respective dye. When the stripping dyes, and their notches, are positioned closely adjacent one another, the notches define a hook slot, which is sized to just accommodate the reciprocal passage of the hook arm.

In one method of using the bead removing system, the tire lift is placed in a horizontal position; the lifting platform is lowered to its lowest position, and the hook arm is retracted. A user may then load a tire onto the tire lift. The tire is then raised to a generally vertical position. The tire should be positioned so that the hook arm will pass through the central opening in the tire, when the hook arm is extended. The hook arm is then extended so that it extends at least partially through the central opening in the tire. The height of the lifting platform is adjusted so that the hook end portion of the hook arm will catch the bead closest to the stripping dyes. The user may now begin extracting the tire bead from the tire. The user retracts the hook arm through the stripping dyes; the bead passes through the hook notch. The width of the hook notch is sized to allow little more than the tire bead to pass. Accordingly, the edges of the stripping dyes scrape the tire rubber from the bead, leaving the tire on one side of the dyes and the bead on the other, once the process is complete. Once the first bead is pulled completely out of the tire, the process may be repeated for the opposing tire bead.

These and other aspects of the present system and method will be apparent after consideration of the Detailed Description and Figures herein. It is to be understood, however, that the scope of the invention shall be determined by the claims as issued and not by whether given subject matter addresses any or all issues noted in the Background or includes any features or aspects recited in this Summary.

DRAWINGS

Non-limiting and non-exhaustive embodiments of the present invention, including the preferred embodiment, are described with reference to the following figures, wherein like reference numerals refer to like parts throughout the various views unless otherwise specified.

DETAILED DESCRIPTION

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense.

A tire debeading system 10 is provided for removing the beads from tires of various sizes and styles. For purposes of simplicity only, the tire debeading system 10 is described herein as the same could be used to remove the beads from OTR tires. It is contemplated that the tire debeading system 10 could be used in a variety of configurations to remove different types of beads from tires of nearly any type and size. Those of skill in the art will appreciate the flexibility of the tire debeading system's design to accommodate a wide array of different tire bead removing tasks.

With reference to FIGS. 1-8, the tire debeading system 10 includes a base frame 12 that, in various embodiments, is angularly disposed to provide a horizontal frame portion 12a and a vertical frame portion 12b. The Figures depict the base frame 12 as being disposed at a right angle, with the horizontal framer portion 12a being longer than the vertical frame portion 12b. However, it should be appreciated that the angular configuration, and length of the component parts, could easily vary according to the intended use of the tire debeading system 10, without departing from the scope of the present technology. Similarly, the base frame 12 is depicted as being in a one-piece, fixed position. However, it is contemplated that the base frame 12 could be made to be modular, collapsible, and/or provided with retractable or fixed position wheels or the like, in order to make the tire debeading system 10 mobile.

Figure 8:
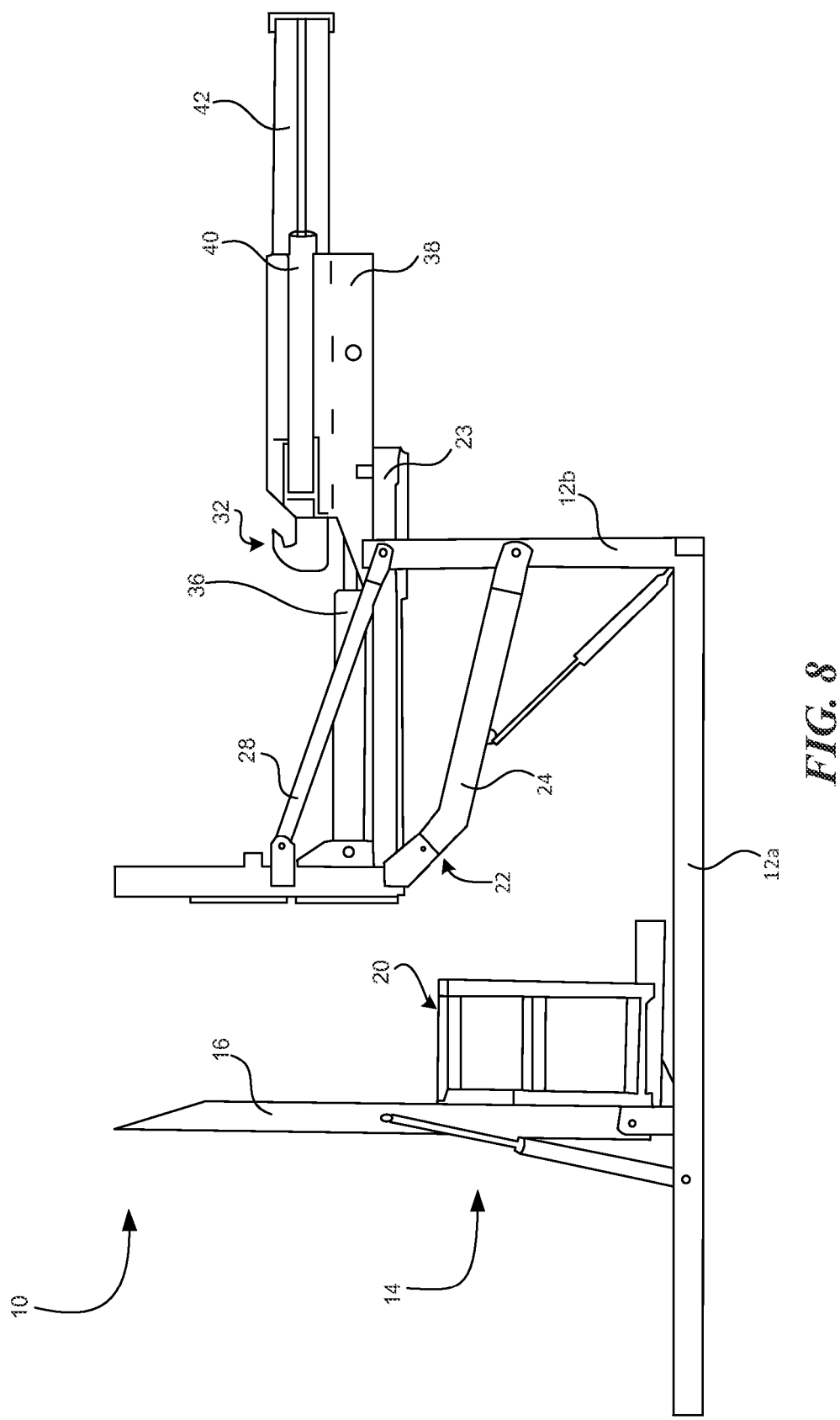
FIG. 8 depicts a side elevation view of the bead removing system depicted in FIG. 1 as it could be positioned in a raised, extracting position.
Figure 9:
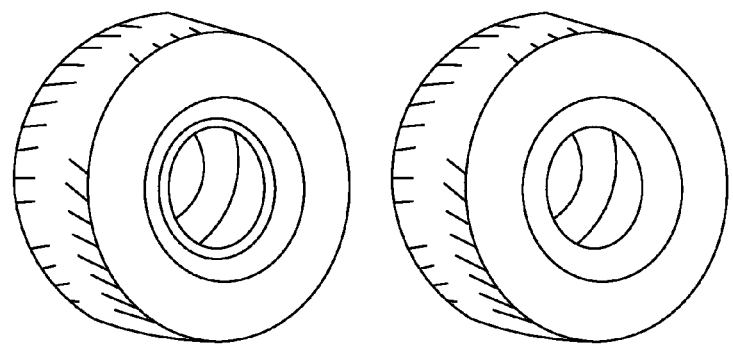
FIG. 9A depicts a typical OTR tire with its bead intact.
FIG. 9B depicts the OTR tire of FIG. 9A after its bead has been removed.
Figure 14:
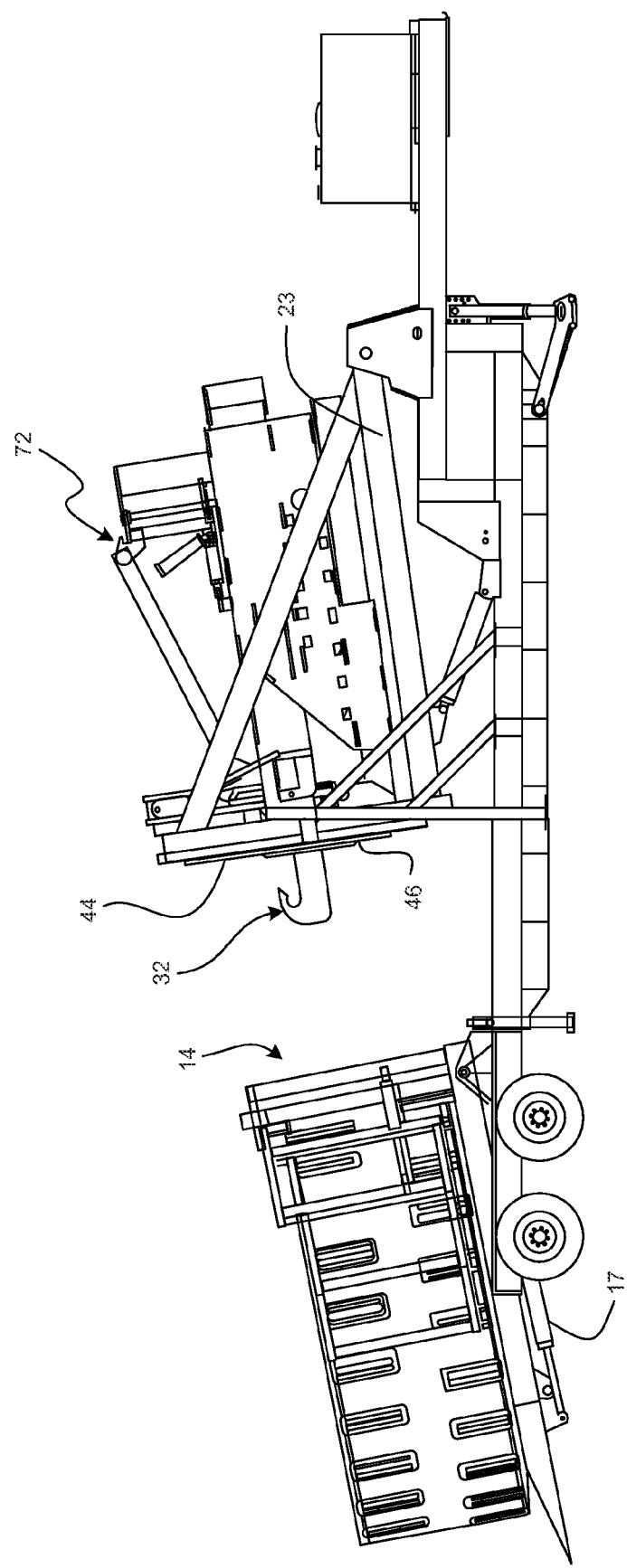
FIG. 14 depicts a side elevation view of one embodiment of the bead removing system of the present technology, depicting one manner in which a tire may be received in a horizontal position within a tire lift.
Figure 15:
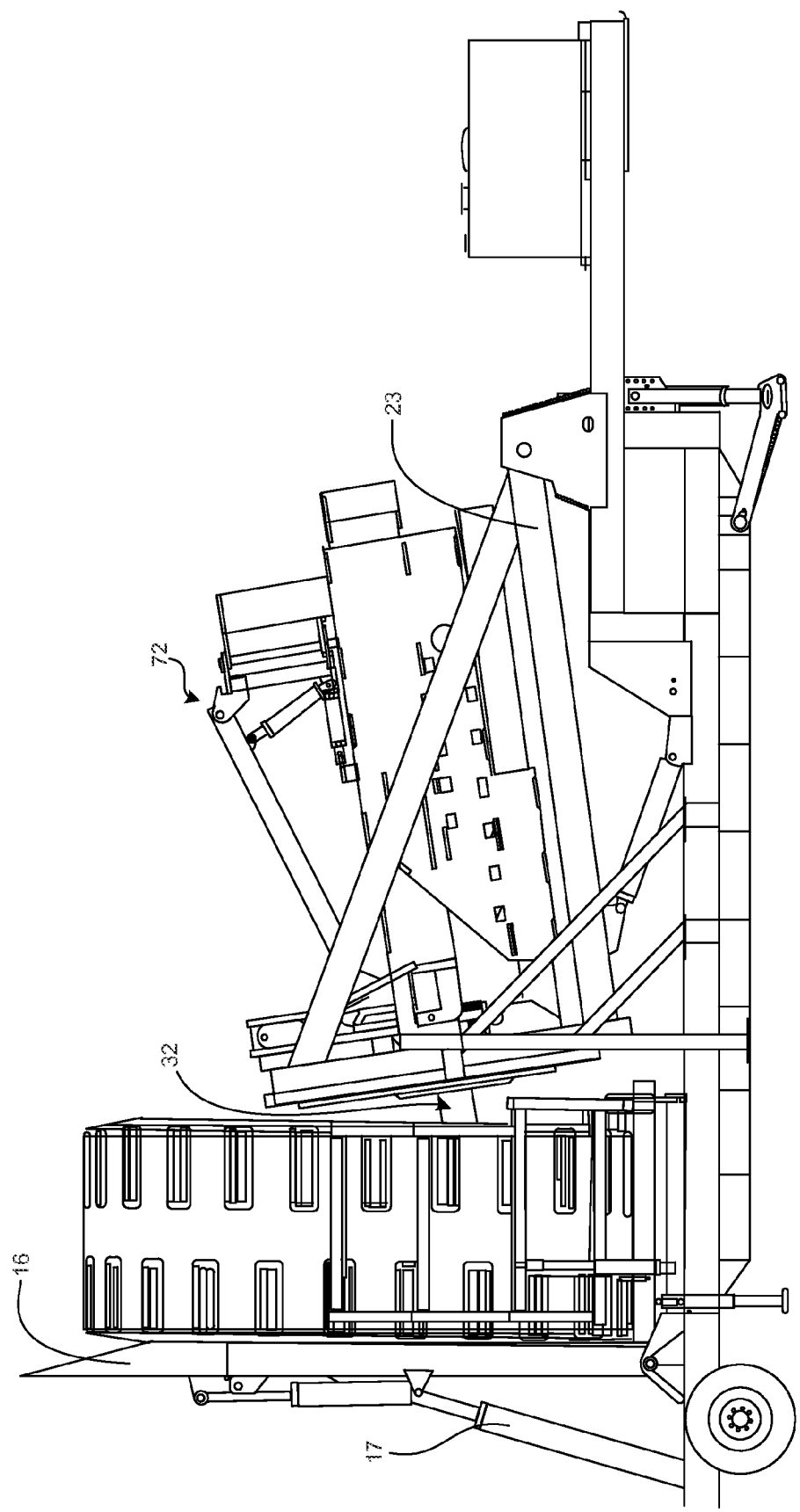
FIG. 15 depicts the bead removing system of FIG. 14 and shows one manner in which the lire lift may vertically position the tire for a bead removing operation.

A tire lift 14 is coupled with a distal end portion of the horizontal frame portion 12a of the base frame 12. In various embodiments, the tire lift 14 includes a tire receiving platform 16. In the depicted embodiments, the tire receiving platform is depicted as being a pair of spaced-apart frame rails that are configured to be in a fixed position with respect to one another but operatively, pivotally coupled with the base frame 12. In this position, the tire lift 14, in a horizontally disposed position (FIG. 7) can receive a tire, such that a sidewall of the tire rests against the tire lift 14. In some embodiments, the tire lift 14 is operatively coupled with one or more power cylinders 16, which are pivotally coupled with the base frame 12 and the tire lift 14. In this arrangement, the power cylinders may be actuated to lift the tire from a horizontal receiving position (FIGS. 7 and 14) to a generally upright cutting position (FIGS. 8 and 15). Those of skill in the art will appreciate that the tire lift can be provided in many different configurations and need not be limited to a pair of spaced apart rails. As depicted, the tire lift 14, regardless of its construction, may be provided with tapered distal end portions in order to more easily receive a tire that is pushed onto the tire lift 14.

A tire support 18 is operatively coupled with the tire lift 14. In the depicted embodiments, the tire receiving platform is depicted as being a pair of spaced-apart frame rails that are configured to be in a fixed position with respect to one another to support the weight of a tire when the tire lift 14 is in the vertical position. The tire support 14 extends from an end portion of the tire lift 14 in an angular manner. In this configuration, the tire support serves as a backstop to stop horizontal movement of a tire as it is being loaded into the tire debeading system 10. In various embodiments, the tire support 18 is coupled with one or more power cylinders (not depicted) that can selectively move the tire support 18 to various positions along a length of the tire lift 14 when the tire lift 14 is in a generally vertical position, such as depicted in FIG. 8. Such power cylinders may be attached beneath a main frame of the tire lift. In this configuration, the vertical position of a tire may be selectively changed with respect to other components of the tire debeading system 10, as will be described in greater detail below.

In various embodiments, a tire cage 20 is operatively coupled with the tire lift 14 and tire support 18. In the depicted embodiments, the tire cage includes a pair of opposing arms 20a and 20b that are pivotally coupled with the tire support 18. In particular, arms 20a and 20b are each angularly or arcuately shaped to approximate the curved periphery (tread surface). Those of skill in the art will appreciate that the size and curved shape of the arms 20a and 20b, as well as the separation distance between the arms 20a and 20b, will need to be provided with sufficient size to accommodate the largest tire circumference anticipated by the system's intended use. In some embodiments, the arms 20a and 20b are pivotally coupled with the tire support 18 or tire lift 14. In this configuration, the arms 20a and 20b of the tire cage 20 may pivot toward and away from one another in a pinching action, between gripping and releasing positions. Where one or more power cylinders (not depicted) are operatively coupled with the arms 20a and 20b, they may be selectively actuated to firmly "grip" tires of various sizes during debeading operations. In this manner, the tire cage 20 provides safety and stability when a tire is raised to a vertical position. The tire cage 20, therefore, prevents the tire from rolling off the tire support 18, before, during, or after bead removal.

In various embodiments, a stripping system lift 22 is operatively coupled with the base frame 12, adjacent its vertical frame portion 12b. The stripping system lift 22 includes a lifting platform 23 that, in some embodiments, is selectively, vertically, positionable with respect to the base frame 12. One or more lower lifting arms 24 are pivotably coupled, at their opposite ends, with the lifting platform 23 and base frame 12, respectively. In some embodiments, a forward end portion of each of the one or more lower lifting arms 24 is coupled with the lifting platform 23, adjacent a forward end portion thereof. Similarly, a rearward end portion of each of the one or more lower lifting arms 24 is coupled with an approximate midpoint of the vertical frame portion 12b. One or more upper lifting arms 28 are pivotably coupled, at their opposite ends, with the lifting platform 23 and base frame 12, respectively. In some embodiments, a forward end portion of each of the one or more upper lifting arms 28 is coupled with the lifting platform 23, adjacent a forward end portion thereof, in a vertically spaced relationship with the forward end portion of each lower lifting arm 24. Similarly, a rearward end portion of each of the one or more upper lifting arms 28 is coupled with an approximate distal endpoint of the vertical frame portion 12b. One or more power cylinders 26 may be coupled with the base frame 12 and the one or more lower lifting arms 24. In some embodiments, such as depicted in FIGS. 14 and 15, a rearward end portion of the one or more power cylinders 26 may be coupled with the base frame 12 adjacent a point where the horizontal frame portion 12a and vertical frame portion 12b meet one another. Similarly, a forward end portion of the one or more power cylinders may be coupled with the one or more lower lifting arms 24 at a point forward from an approximate midpoint of the one or more lower lifting arms 24.

An extendable hook arm 30 is supported by the lift platform 22. In various embodiments, a forward end portion of the hook arm 30 is provided with a hook end portion 32 having a sharpened edge directed toward a rearward end of the bead removing system 10. A hook extension power cylinder 34 may be operatively coupled with the hook arm, so that the hook arm 30 may be selectively extended and retracted with respect to the lift platform 22. In some embodiments, the hook arm 30 may be operatively coupled with one or more extension arms for further, selective, reciprocal movement of the hook arm 30. In one such embodiment, depicted in FIGS. 5-8, a plurality of cooperating arms and power cylinders may move in a generally telescopic manner with respect to one another to provide simultaneous, or successive, linear movement of the hook arm 30 with respect to the lifting platform 23. With specific reference to the embodiment in FIGS. 5 and 6, a stage one power cylinder 36 is operatively coupled with a forward portion of the lifting platform 23, at one end portion, and a stage one arm 38, at the opposite end portion. Actuation of the stage one power cylinder 36 moves the stage one arm 38, linearly and in a reciprocal fashion, along a length of the lifting platform. A stage two power cylinder 40 is operatively coupled with the stage one arm 38, at one end portion, and a stage two arm 42, at the opposite end portion. Actuation of the stage two power cylinder 40 moves the stage two arm 42, linearly and in a reciprocal fashion, with respect to the stage one arm 38 and the lifting platform 23. One end portion of the hook extension power cylinder 34 may be coupled with the stage two arm 42 while the opposite end portion is coupled with the hook arm 30.

Figure 1:
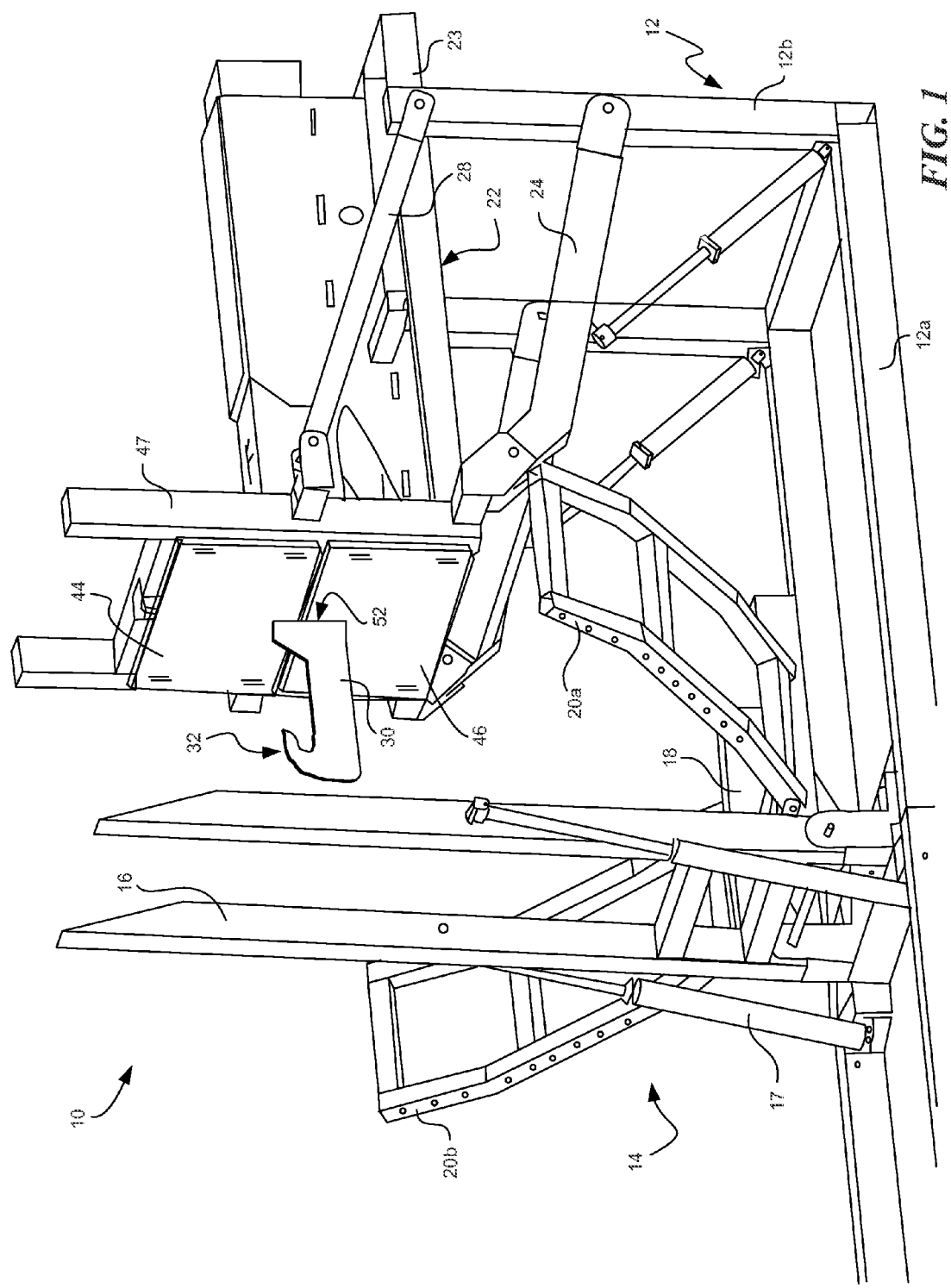
FIG. 1 depicts a front perspective view of one embodiment of the bead removing system of the present technology.
Figure 2:
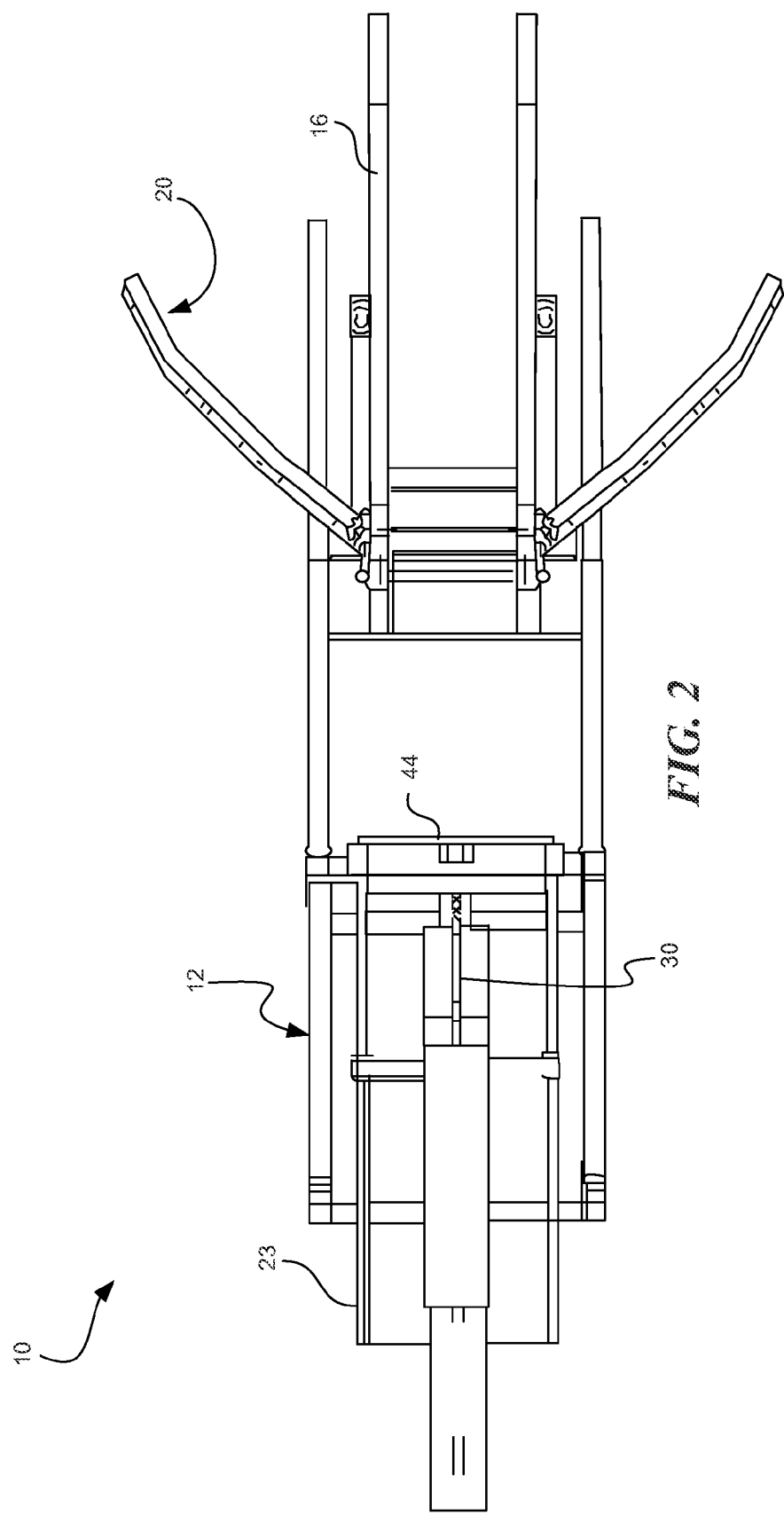
FIG. 2 depicts a top plan view of the bead removing system depicted in FIG. 1.
Figure 3:
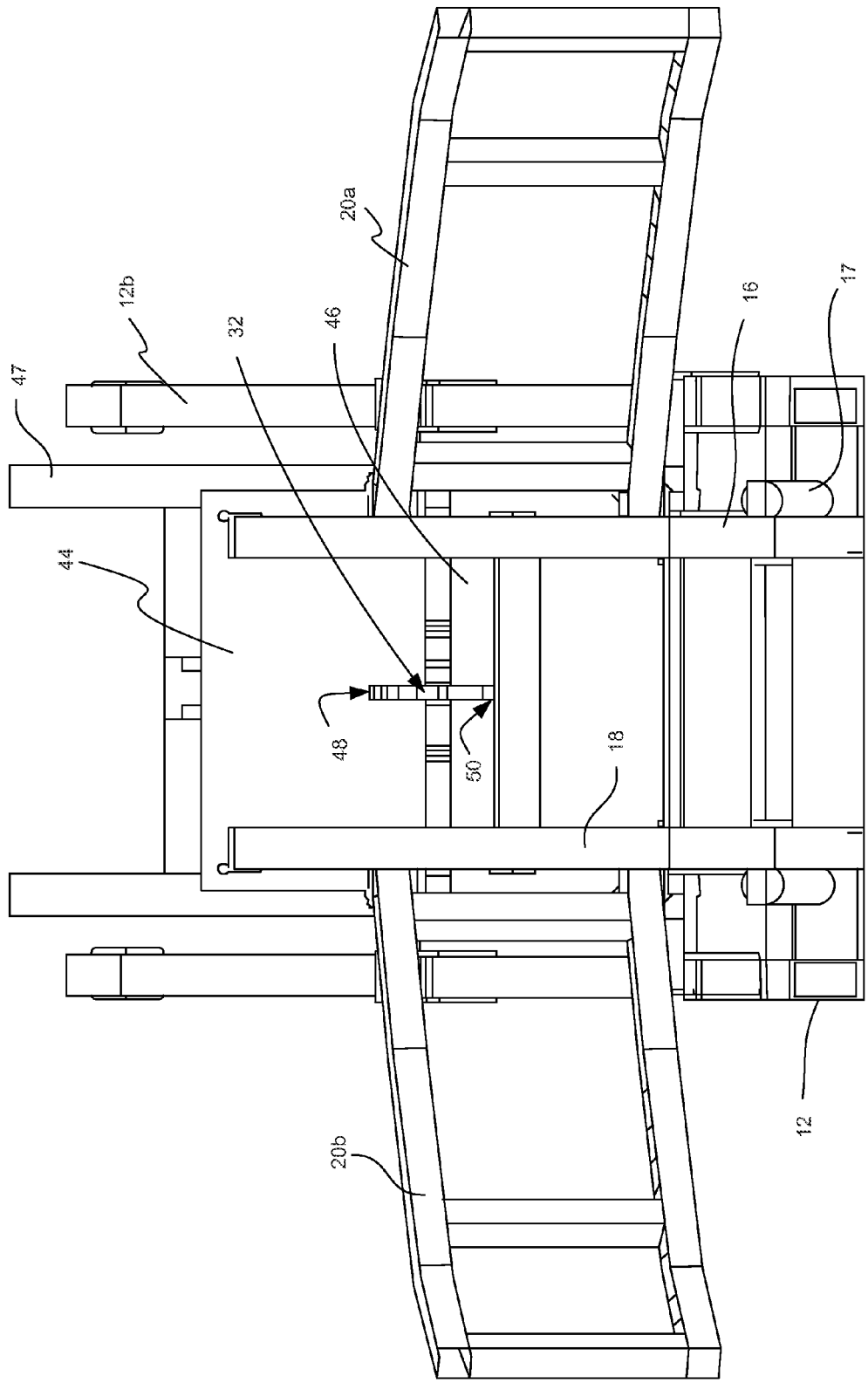
FIG. 3 depicts a front elevation view of the bead removing system depicted in FIG. 1 as it may be placed in a first receiving position.
Figure 4:
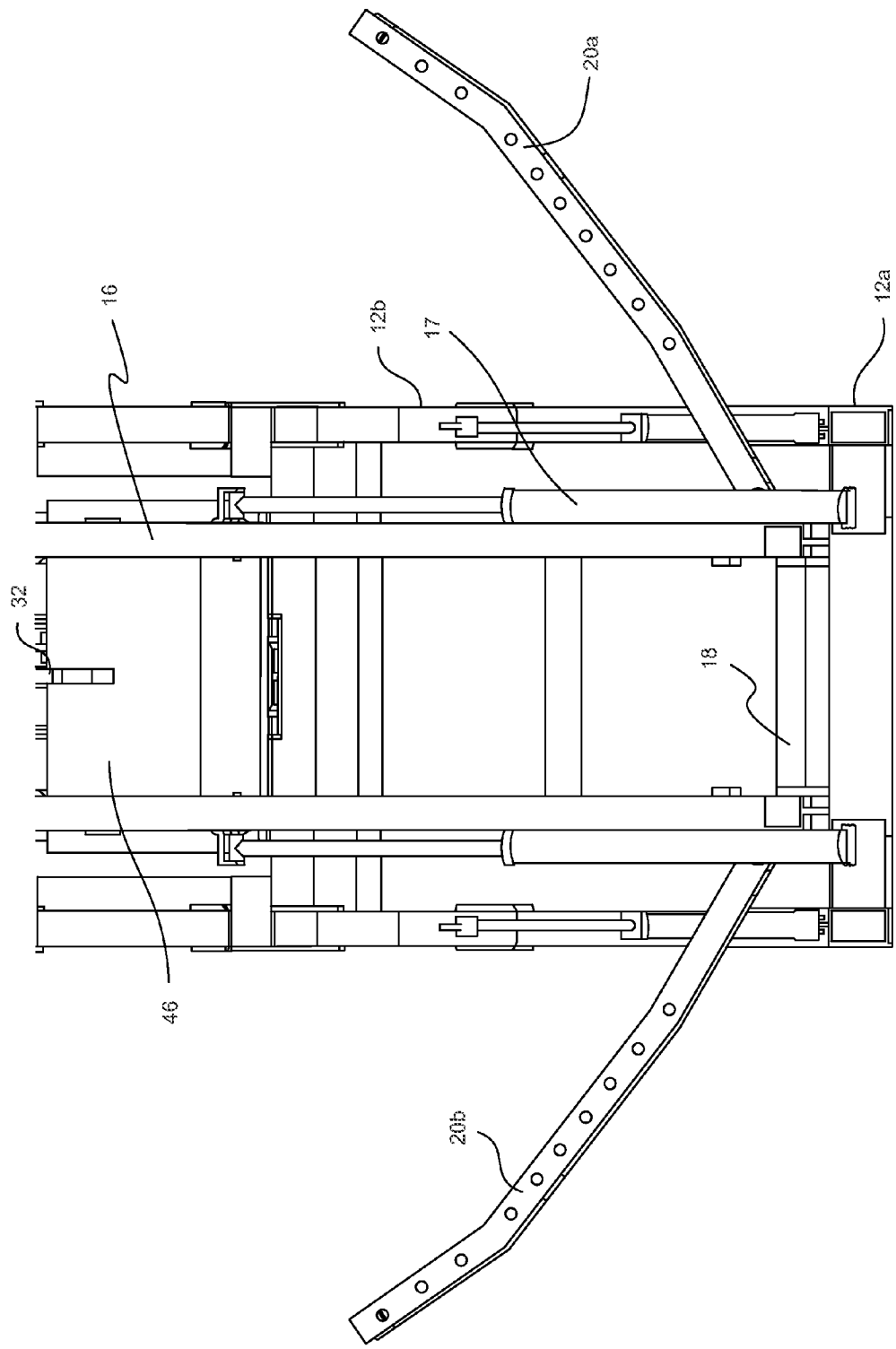
FIG. 4 depicts another front elevation view of the bead removing system depicted in FIG. 1 as it may be placed in a second tire retaining position.
Figure 5:
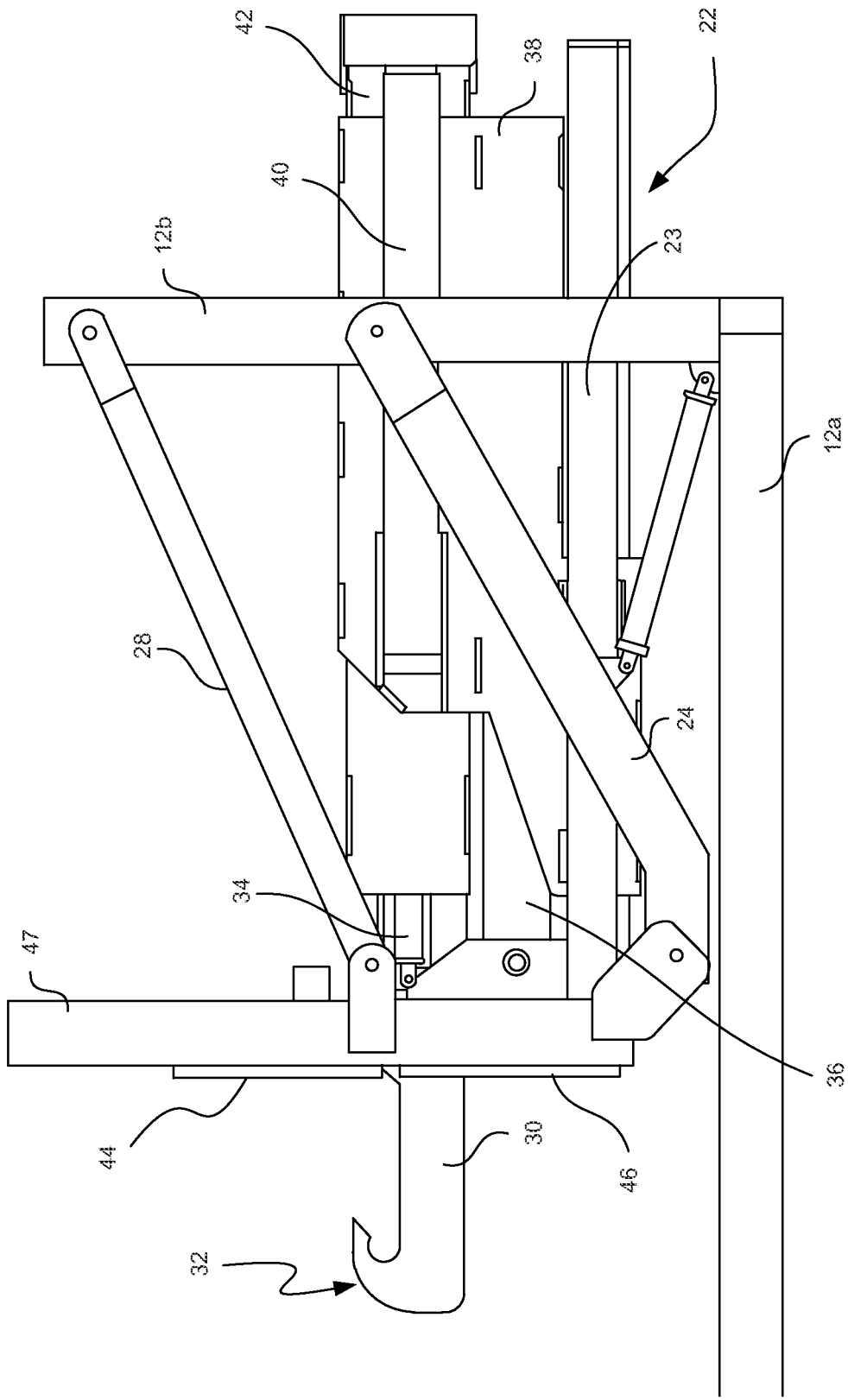
FIG. 5 depicts a partial isometric view of one embodiment of a hook arm assembly that could be used with the bead removing system depicted in FIG. 1.
Figure 6:
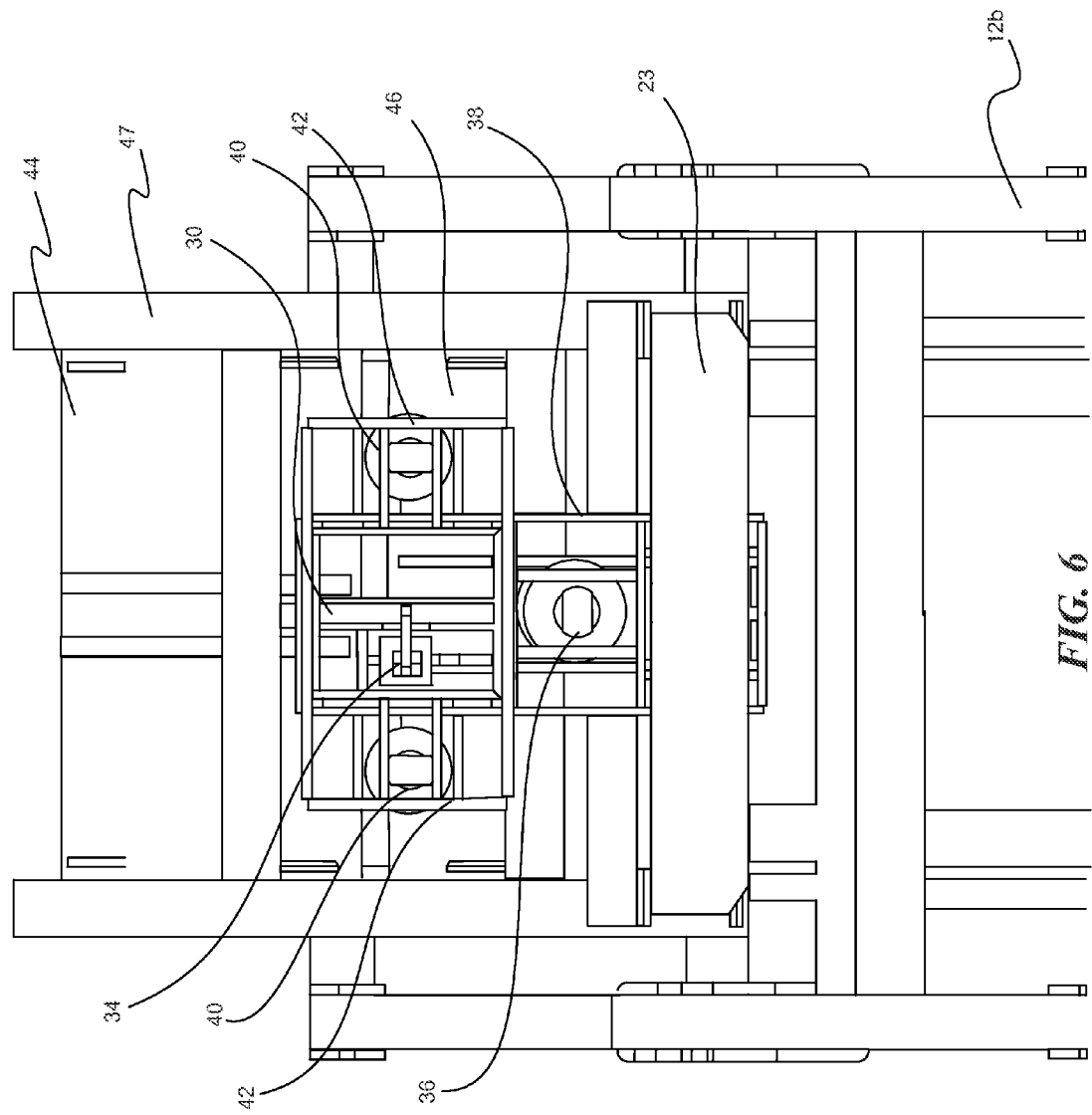
FIG. 6 depicts a rear elevation view of the bead removing system depicted in FIG. 1.
Figure 7:
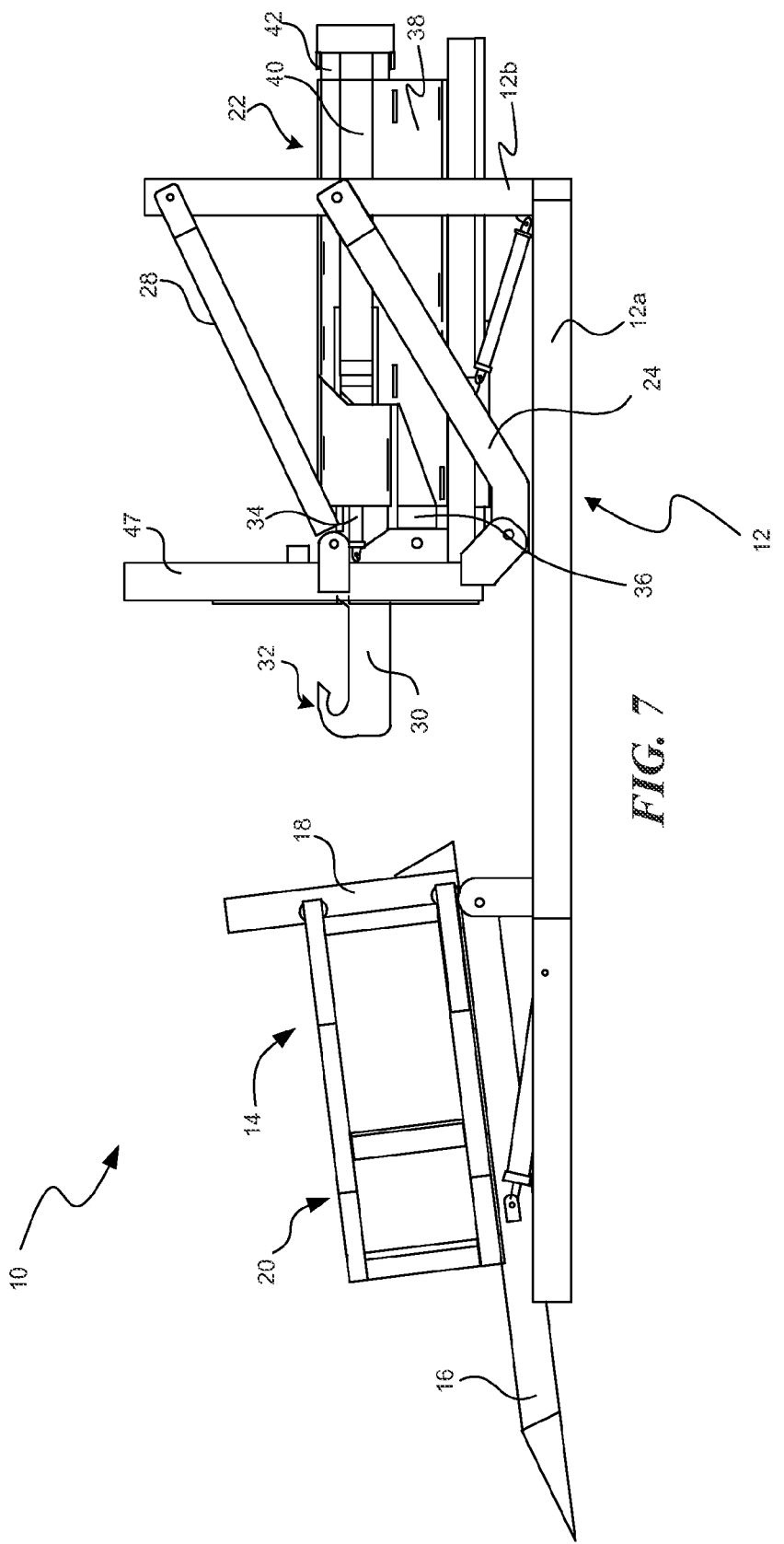
FIG. 7 depicts a side elevation view of the bead removing system depicted in FIG. 1 as it could be positioned in a lowered, starting position.

With reference to FIG. 1, a pair of opposing stripping dyes 44 and 46 are positioned to extend transversely across the lifting platform 23, at its forward end portion. The stripping dyes 44 and 46 are coupled with the stripping dye frame 47 so they may be selectively moved toward and away from one another. In various embodiments, the movement may cause only one dye to move; whereas, other embodiments may provide for movement of both dyes in a reciprocal fashion toward and away from one another. In either respect, one or more power cylinders (not depicted) may be coupled with the dyes and adjacent supporting structures to effectuate the desired dye movement. While it is contemplated that a single stripping dye may be used with the present technology, the use of a pair of dyes, where at least one is movable, allows for ease of cleaning tire debris from the system after use and clearing any jams. In various embodiments, the stripping dyes 44 and 46 are provided with hook notches 48 and 50, respectively, which are open to one peripheral edge of each respective dye. The stripping dyes 44 and 46 are positioned so that the openings of the hook notches 48 and 50 are lined up with one another, placing them in open communication with one another. When the stripping dyes 44 and 46, and their notches 48 and 50, are positioned closely adjacent one another, the notches 48 and 50 define a hook slot 52, which is sized to just accommodate the reciprocal passage of the hook arm 30.

Figure 10:
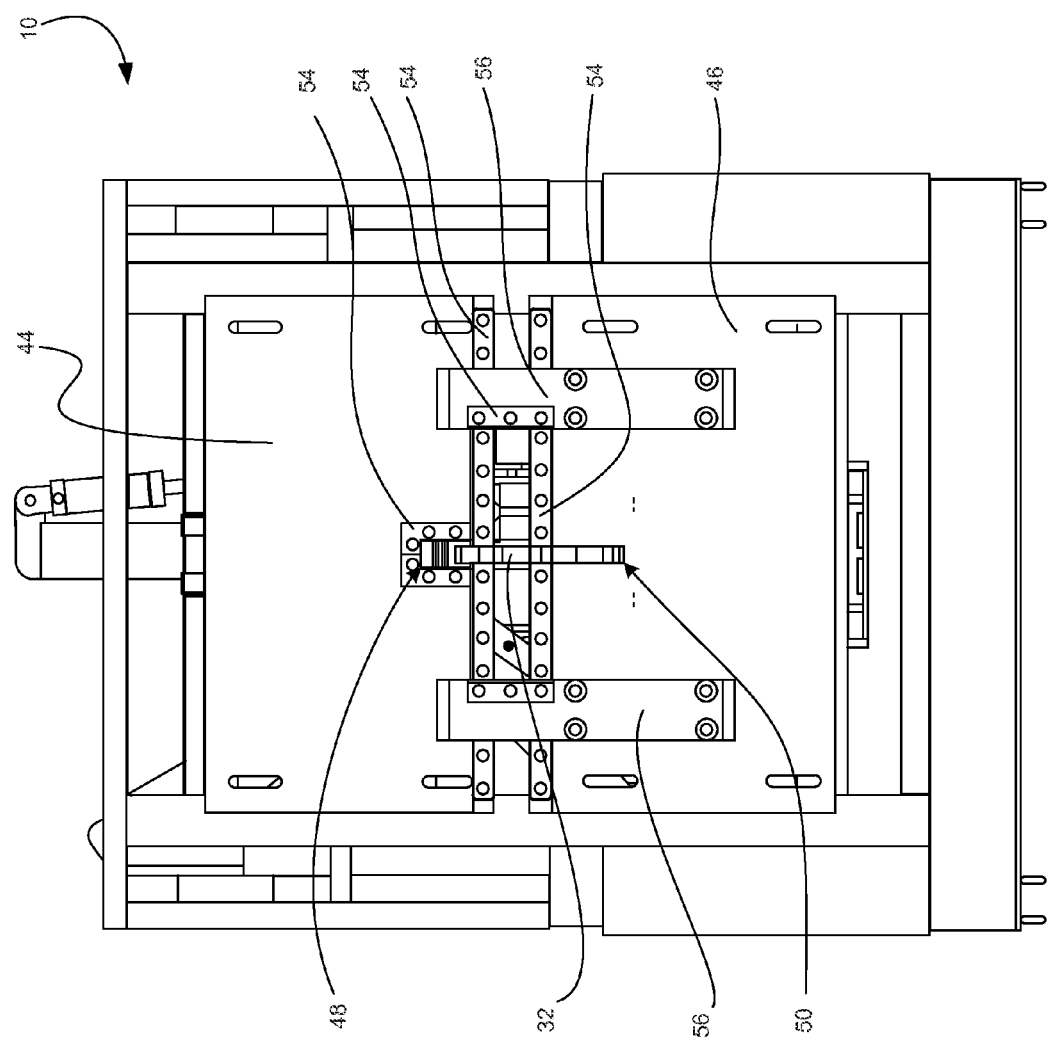
FIG. 10 depicts a front elevation view of one embodiment of stripping dyes that may be used with the bead removing system of the present technology.

With reference to FIG. 10, embodiments of the tire debeading system provide edge portions of the stripping dyes 44 and 46 with one or more removable bead engagement edges 54. For example, edge portions of either or both of hook notch 48 and hook notch 50 may be provided with lengths of bead engagement edge 54. In some embodiments, the lengths of bead engagement edge 54 may line portions or all of the individual hook notches. Similarly, lengths of the opposing, interior edges of stripping dye 44 and stripping dye 46 may be provided with lengths of removable bead engagement edge 54. It is contemplated that embodiments of the bead engagement edge 54 will be formed from one or more known hardened materials, having a hardness greater than that used to form stripping dye 44 and stripping dye 46. It will be desirable, for long term use of the tire debeading system 10, to use such materials in view of the continued engagement between such edge portions and the stripping movement of tire beads. It is contemplated that the bead engagement edges may be removably coupled with the stripping dye 44 and stripping dye 46 using mechanical fasteners. In such embodiments, the bead engagement edges 54 may rest against the forward surfaces of the stripping dye 44 and stripping dye 46, leaving the bead engagement edges proud of the forward surfaces. In other embodiments, the bead engagement edges 54 may be positioned in recesses that dispose forward surfaces of the bead engagement edges 54 flush with the forward surfaces of the stripping dye 44 and stripping dye 46. Embodiments of the bead engagement edges 54 may provide eased, or radiused, corners where direct engagement with the tire beads occurs.

With continued reference to FIG. 10, embodiments of the tire debeading system 10 couple one or more stripper bars 56 with one or both of the forward surfaces of stripping dye 44 and stripping dye 46. In various embodiments, the stripping bars 56 are provided as elongated plates, each having first end portions secured with one of the stripper dye 44 or stripper dye 46. The stripper bars 56 are, in at least some embodiments, secured to one stripping dye such that lengths of the stripper bars and their second end portions extend over the forward surface of the opposing stripping dye when the opposing stripping dyes are in a closed position. Some embodiments provide the lengths of the stripper bars 56 such that they extend over the forward surface of the opposing stripping dye when the opposing stripping dyes are in an open position as well. While it is contemplated that one stripper bar 56 could be used, various embodiments of the present technology couple a pair of stripper bars 56 to a forward surface of at least one of the opposing stripping dyes 44 or 46. Each of the stripper bars are positioned between a peripheral edge portion of the stripping dye and the hook slot 52, with the hook slot 52 positioned between the two stripper bars 56. The stripper bars 56 may be removably coupled with the stripping dye using mechanical fasteners. It is also contemplated that the stripping bars 56 could be permanently secured with the stripping dye by welding or other permanent securement means.

Embodiments of the stripper bars 56 are provided with bead engagement edges 54, which may be permanently or removably secured, with the stripper bars 56. Such embodiments may position the bead engagement edges alongside portions of the stripper bars 56 that face the hook slot 52, adjacent the interior edges of stripping dye 44 and stripping dye 46. In some embodiments, the stripper bars 56 are raised above a forward surface of the stripping dye 44 and stripping dye 46. In this manner, the lengths of bead engagement edge 54 act with the hook end portion 32, as the bead is pulled from the tire and the hook end portion 32 passes through the hook slot 52, to angle the tire bead and force initial stripping contact between the bead edge portions 54 on the stripper bars 56. Secondary stripping contact may then occur between the lengths of bead engagement edges 54 located at the interior edges of stripping dye 44 and stripping dye 46.

Figure 11:
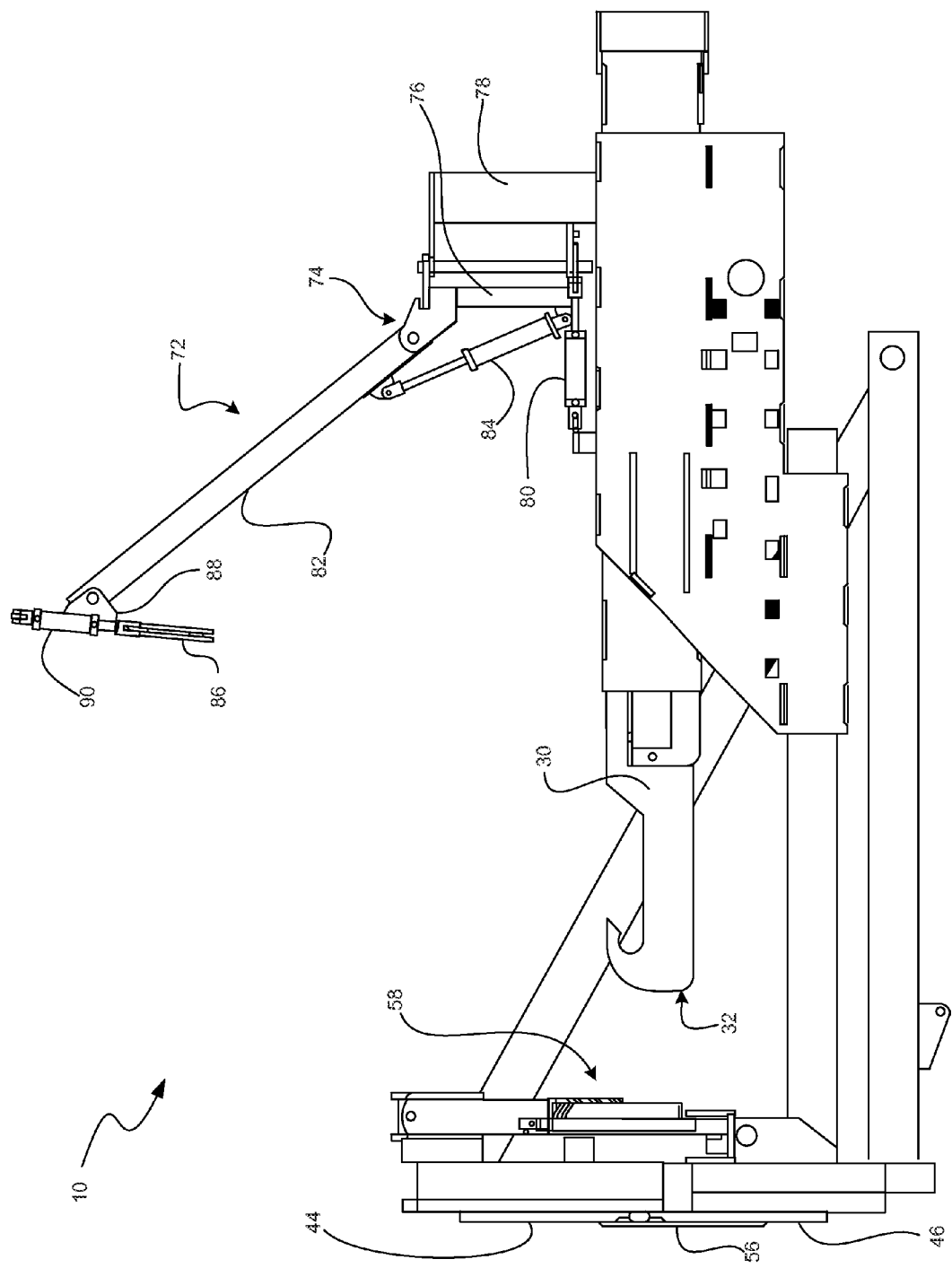
FIG. 11 depicts a partial side elevation view of an embodiment the bead removing system of the present technology.
Figure 12:
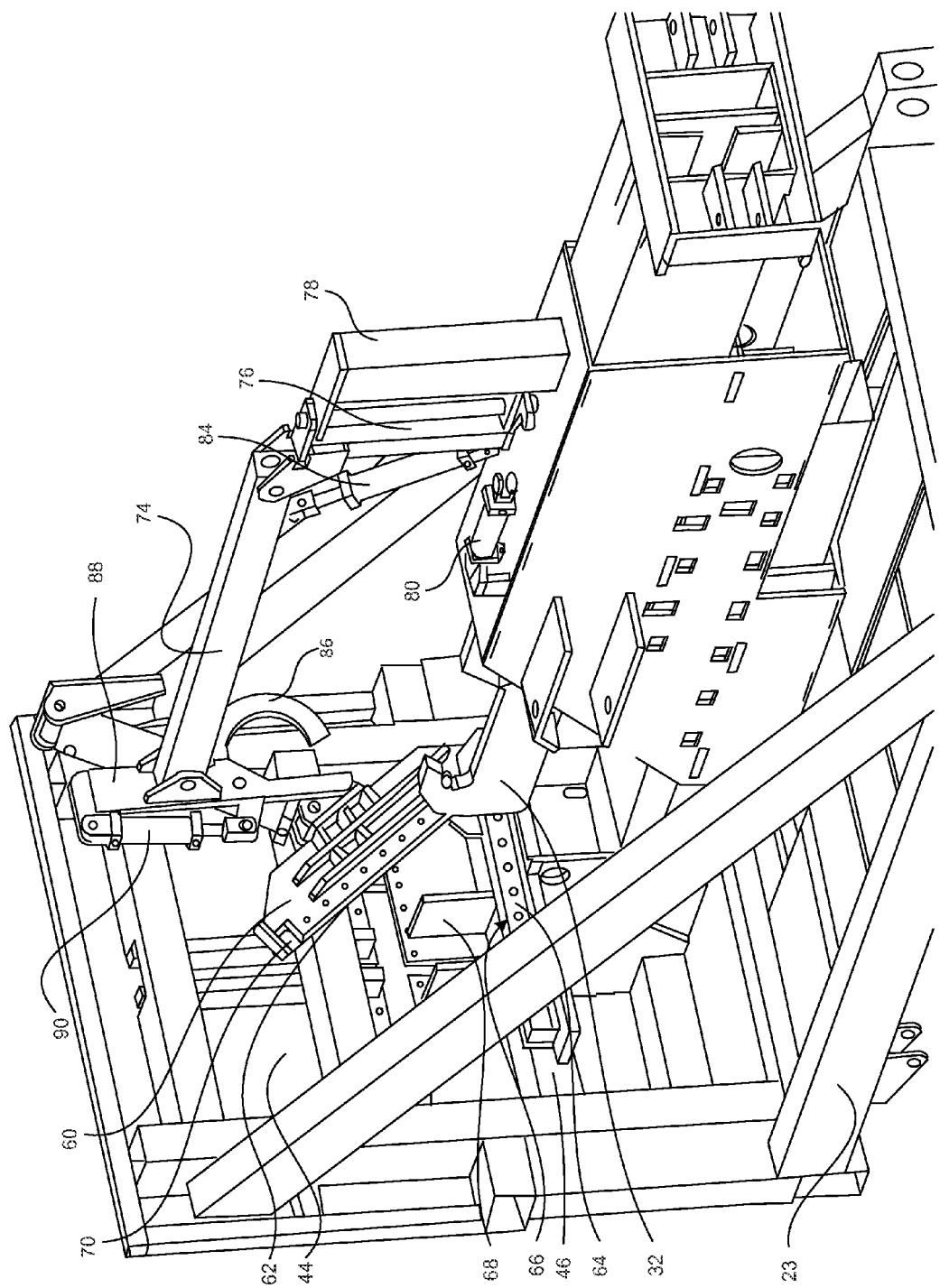
FIG. 12 depicts a partial, rear perspective view of the bead removing system depicted in FIG. 11.
Figure 13:
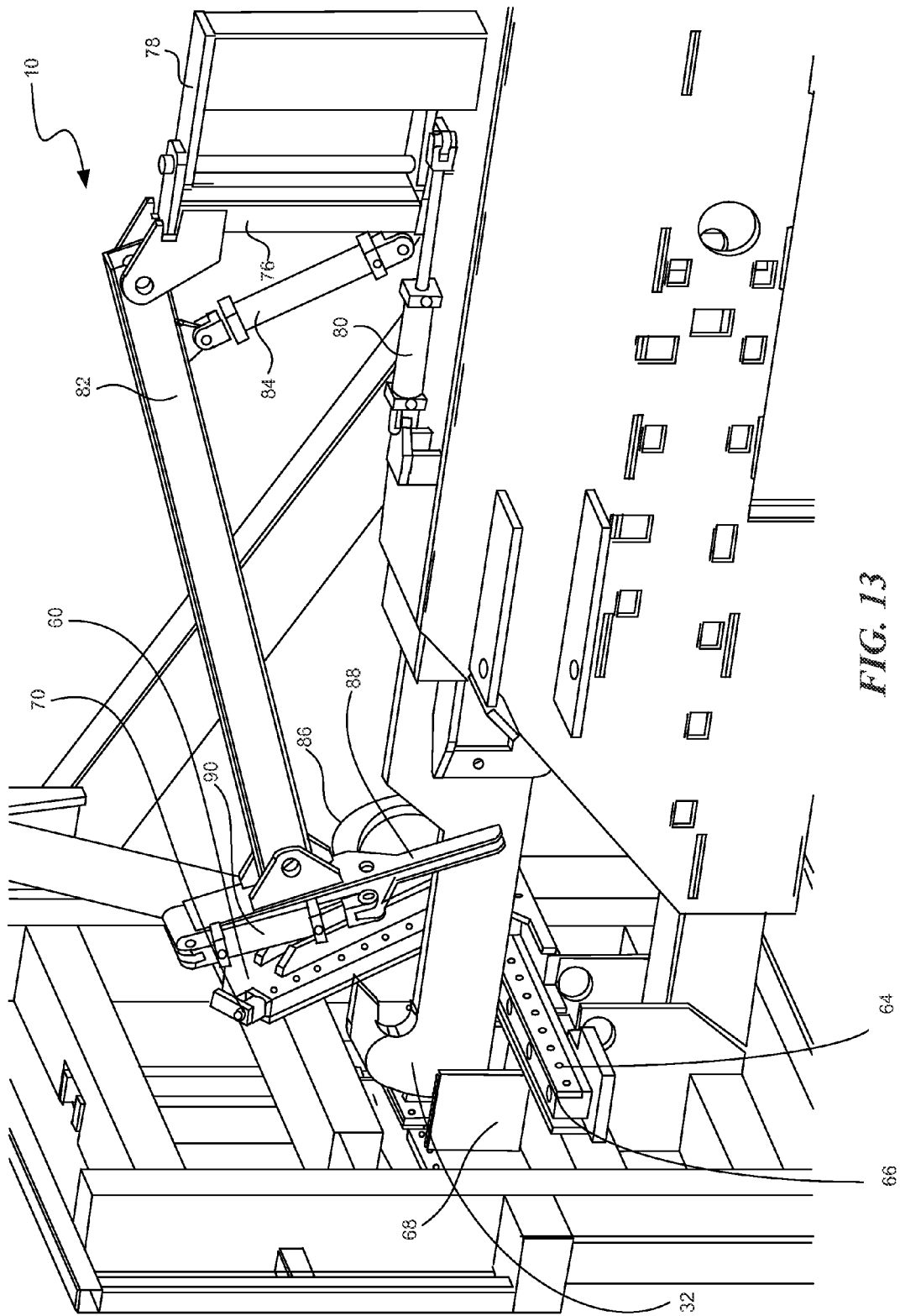
FIG. 13 depicts a rear isometric view of embodiments of an extendable hook arm, shear, and bead crane, as they may form a part of the bead removing system of the present technology.

With reference to FIGS. 11-13, the tire debeading system 10 includes a shear 58 that can be used to cut portions of the tire body that remain on the tire bead after it has been substantially pulled from the tire. In some embodiments, the shear 58 includes at least one blade arm 60 with a cutting surface 62 that is movable with respect to a second arm 64, between open and cutting positions. In the depicted embodiment, the second arm is provided to be a blade receiving arm, having a striking surface 66 that is shaped to receive the cutting edge 22 in a manner that severs material disposed therebetween. In some embodiments, the striking surface 66 may be rigid while other embodiments may provide the striking surface 66 to be deformably resilient. Similarly, the striking surface 66 may include a channel that at least partially receives a portion of the cutting surface 62 beyond the face of the striking surface 66. In the depicted embodiment, the second arm 64 is provided in a fixed position with respect to the blade arm 60 and the remainder of the tire debeading system 10. Other embodiments, however, may provide a second arm to pivotably move in opposition to the blade arm 60. In such embodiments, the second arm 64 may include a cutting surface to oppose the cutting surface 62.

In the depicted embodiments, the second arm 64 of the shear 58 is secured to adjacent framing such that it is positioned adjacent the hook slot 52 so that a length of the second arm 64 extends parallel to the stripping dye 46, just below the hook slot 52. A pair of guide plates 68 may be positioned between the striking dye 46 and the second arm 64. The guide plates are horizontally spaced apart, with the hook slot 52 disposed therebetween. The guide plates 68 assist in focusing the path of the tire bead and any tire remnants past the stripping dyes and through the shear 58. A rearward end portion of the blade arm 60 is pivotably coupled with one end of the second arm 64. A power cylinder 70 is coupled with the blade arm 60 such that selective actuation of the power cylinder 70 advances the blade arm 60 between open and cutting positions with respect to the second arm 64.

With continued reference to FIGS. 11-13 embodiments of the tire debeading system 10 include a bead crane 72 having a boom arm 74 that is pivotably coupled with adjacent framing or another stable structure, such as the cover to the hook arm assembly. In the depicted embodiment, the boom arm 74 includes a vertical support 76, which is pivotably coupled to bracket 78 to enable rotation of the boom arm along a horizontal plane using power cylinder 80. Extension arm 82 is pivotably coupled at one end to an upper end portion of the vertical support 76 to enable the extension arm to pivot along a generally vertical plane using power cylinder 84. Embodiments of the bead crane 72 are provided with a bead grapple 86. In the depicted embodiment, the bead grapple 86 is provided as a hook shaped arm that is pivotably coupled to a grapple bracket 88, such that the bead grapple moves between open and closed positions with respect to a distal end portion of the grapple bracket. In some embodiments, the grapple bracket 88 includes a grapple passage that allows at least a portion of the bead grapple 86 to pass therethrough. In this manner, the bead grapple 86 can tighten its grip on a length of tire bead between the bead grapple 86 and the grapple bracket 88 using power cylinder 90. Once a length of tire bead is secured by the bead grapple 86, the bead crane 72 may pivot horizontally to move the tire bead away from the tire debeading system 10, where it is released for later collection.

Figure 16:
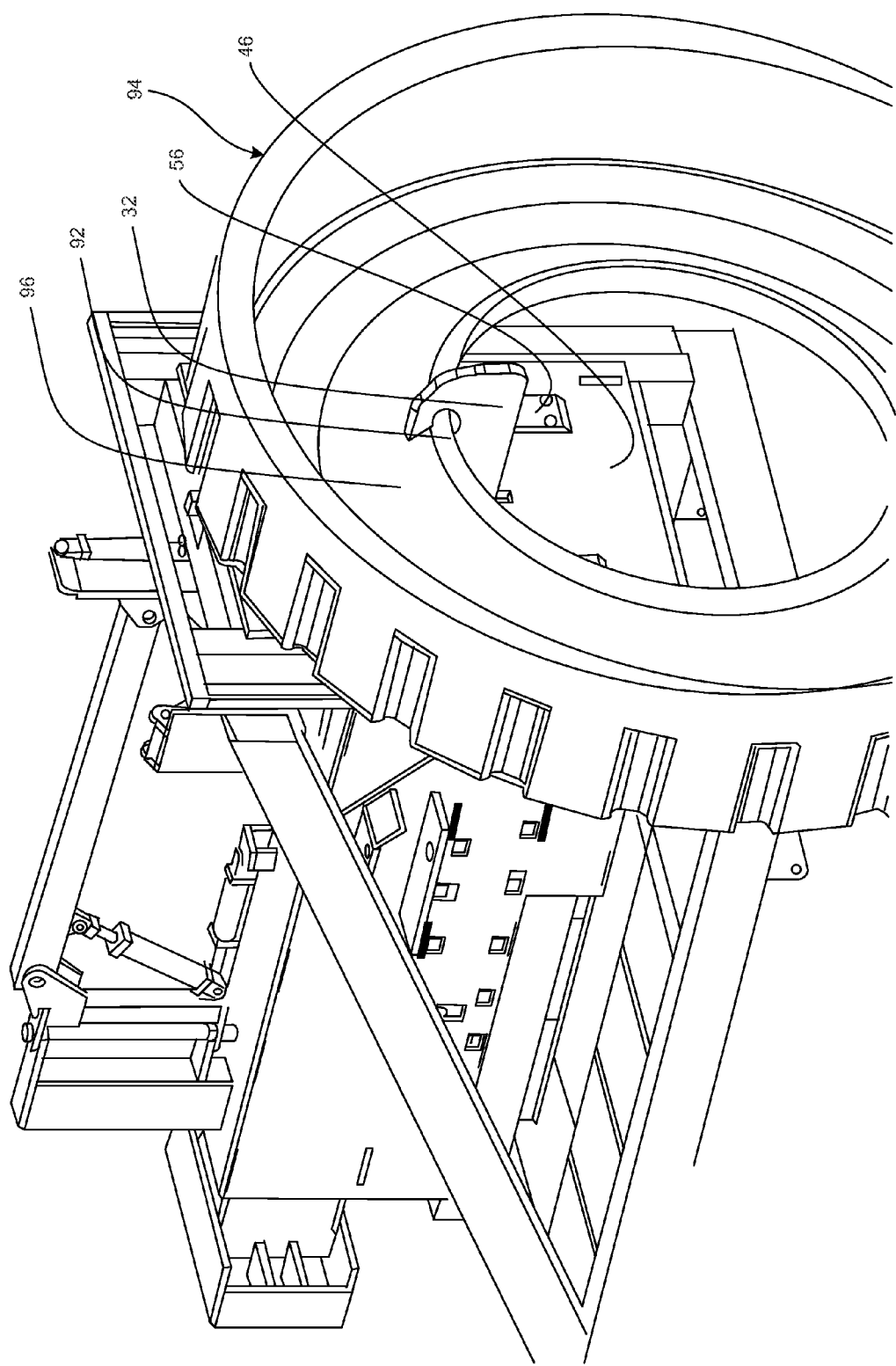
FIG. 16 depicts a partial, cut-away, view of the bead removing system of FIG. 15 and shows one manner in which the hook end portion of the extendable hook arm may be positioned to begin removing a bead from the tire.

In one method of using the bead removing system 10, depicted in FIGS. 14-18, the tire lift 14 is placed in a horizontal position; the lifting platform 23 is lowered to its lowest position, and the hook arm 30 is retracted. A user may then load a tire 94 onto the tire lift 14, with a sidewall of the tire positioned against the tire receiving platform 16 and the tread touching the tire support 18 and tire cage 20, as depicted in FIG. 14. It is contemplated that due to the size of most large OTR tires, the tire may be loaded onto the bead removing system 10 using a telehandler, pay loader, or the like. The tire cage 20 may need to be adjusted in or out depending on the size of the tire. The tire is then raised to a generally vertical position by actuating the power cylinder 17 associated with the tire lift 14, as depicted in FIG. 15. The tire should be positioned so that the bead 92 and sidewall 96 of the tire faces the bead stripping dyes 44 and 46, as depicted in FIG. 16. In doing so, it is recommended that the tire be positioned to a height where the hook arm 30 will pass through the central opening in the tire, when the hook arm 30 is extended. If necessary, the lift platform may be raised to adjust the tire height. In some embodiments, the stripping system lift can angle or elevate the lifting platform 23, relative to the tire, in order to optimize the position of the hook arm 30. The hook arm 30 is then extended so that it extends at least partially through the central opening in the tire. The height and/or angle of the lifting platform 23 may now be adjusted so that the hook end portion 32 of the hook arm 30 will catch the bead closest to the stripping dyes 42 and 44. Once the hook end portion 32 is raised into position, the user will verify that the tire bead is positioned into the hook, so that the tire sidewall just above the tire bead will be punctured by the hook end portion 32, before pulling the bead, as depicted in FIG. 16. This adjustment of the hook arm 30 position may be accomplished by actuating the hook extension power cylinder to set the position of the hook end portion 32 with respect to the tire bead.

Figure 17:
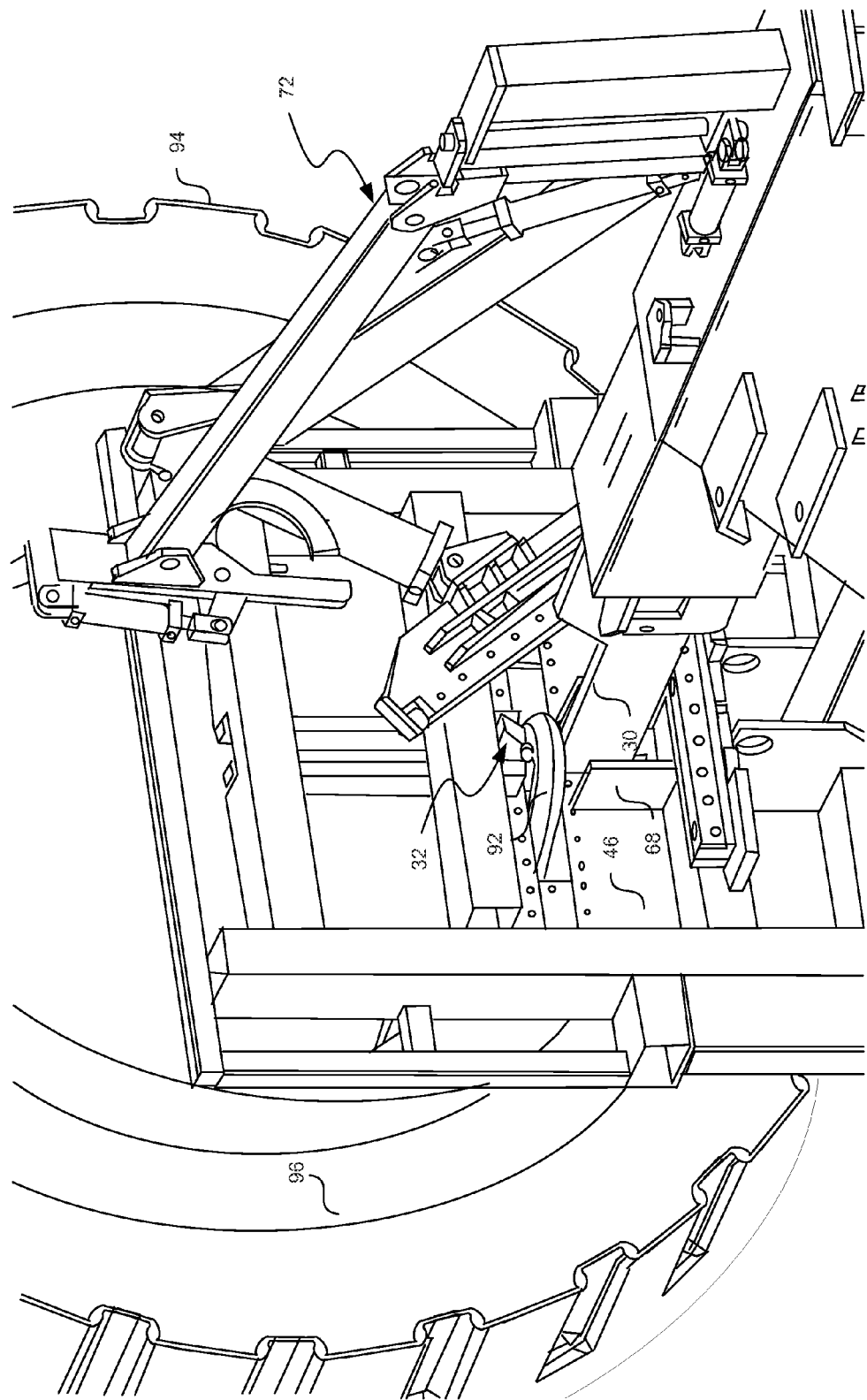
FIG. 17 depicts a rear perspective view of the bead removing system of FIG. 16 and shows the initial stages of one manner in which the bead may be extracted from the tire.
Figure 18:
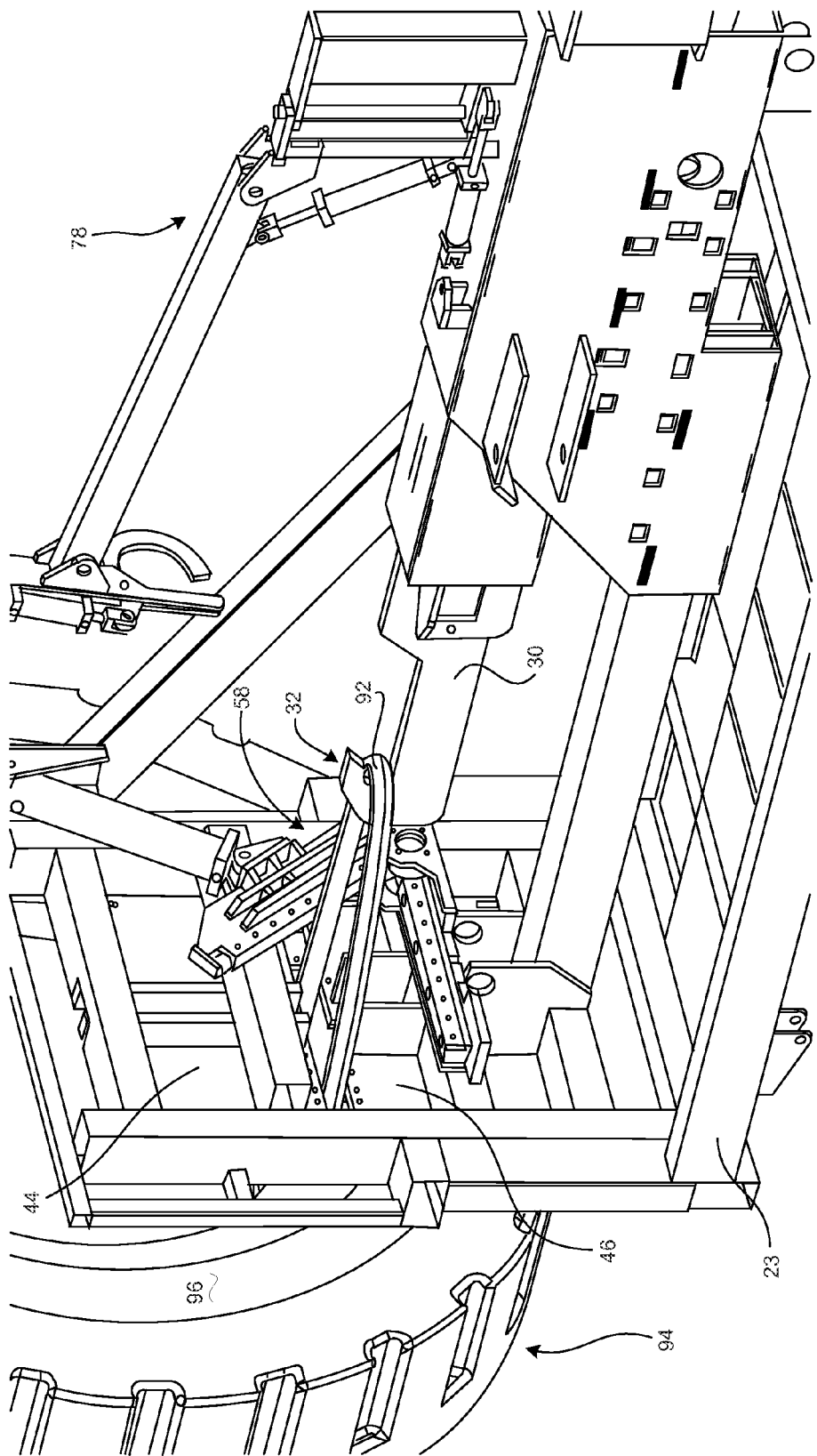
FIG. 18 depicts a rear perspective view of the bead removing system of FIG. 17 and demonstrates the continued removal of the bead from the tire.

The user may now begin extracting the tire bead 92 from the tire 94. First, if the hook arm 30 is extended, the user brings it back away from the tire, so the hook arm 30 can be locked into the pulling position. The embodiments of the bead removing system 10 depicted in the Figures is a two-stage system. Accordingly, the stage one cylinder 36 is actuated first and begins the bead pulling process. Once the stage one power cylinder 36 is fully extended, the stage two power cylinder 40 is actuated and finishes pulling the bead out of the tire. As the power cylinders retract the hook arm 30 through the stripping dyes 44 and 46, the bead passes through the hook slot 52 and/or through the gap between the stripping dye 44 and stripping dye 46, as depicted in FIGS. 17 and 18. However, the width of the hook slot 52 is sized to allow little more than the tire bead to pass. Accordingly, the edges of the stripping dyes 44 and 46 scrape the tire rubber from the bead, leaving the tire on one side of the dyes and the bead on the other, once the process is complete. In order to further the stripping process, as the bead is being pulled out of the tire, the lifting platform 23 may be lowered; keeping the height of the hook end portion 32 the same as the height of the bead that is being stripped out of the tire. The lowering of the lifting platform stops the tire from lifting off of the tire support 18, keeping the weight of the tire on the tire support 18.

Once the first bead is pulled completely out of the tire, the stage two power cylinder 40, stage one power cylinder 36, and hook extension power cylinder 34, bring the hook arm 30 back to release the tension on the tire bead. Where excess tire material remains coupled to the tire bead and the tire, the shear 58 may be actuated to sever the connection. The user may then use the bead crane 72 to grasp the tire bead and move it away from the hook arm 30, clear of the tire debeading system 10. The hook arm 30 may then be returned to its initial position. Using the hook extension power cylinder 34, the hook end portion 32 is extended until it is just past the second tire bead. The lifting platform 23 will likely need to be lowered so the hook end portion 32 can reach out to the opposite side of the tire. Once the hook end portion 32 is past the second bead, the lifting platform 23 is raised until the bead rests adjacent the hook end portion 32. The hook arm 30 may now be retracted toward the dyes until the user is certain that the hook end portion 32 catches the second bead. When the second bead is hooked, the above described steps may be repeated for extracting the tire bead. After the second bead is completely withdrawn from the tire, the hook arm 30 is moved toward, but not through, the stripping dyes 44 and 46. Before lowering the tire lift 14, the tire support 18 is lowered to its lowest position. The tire lift 14 can now be lowered down to the horizontal position. Finally, the tire can be removed from the tire lift 14.

Although the technology been described in language that is specific to certain structures, materials, and methodological steps, it is to be understood that the invention defined in the appended claims is not necessarily limited to the specific structures, materials, and/or steps described. Rather, the specific aspects and steps are described as forms of implementing the claimed invention. Since many embodiments of the invention can be practiced without departing from the spirit and scope of the invention, the invention resides in the claims hereinafter appended. Unless otherwise indicated, all numbers or expressions, such as those expressing dimensions, physical characteristics, etc. used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques. Moreover, all ranges disclosed herein are to be understood to encompass and provide support for claims that recite any and all subranges or any and all individual values subsumed therein. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

What is claimed is:

1. A system for removing beads from tires, the system comprising:
   a support frame;
   an elongated hook arm having a forward end portion, a rearward end portion, and a long axis that extends between the forward end portion and rearward end portion; the forward end portion having a hook that bends toward the rearward end portion; the elongated hook arm being operatively coupled with the support frame in a manner that permits selective reciprocal movement of the elongated hook arm along its long axis, between extended and retracted positions;
   a pair of separate, opposing stripping dies disposed in a common plane, operatively coupled with the support frame; the stripping dies having forward surfaces, rearward surfaces, and a hook slot that penetrates the stripping dies; the hook slot being shaped to allow at least a portion of the elongated hook arm to pass through the stripping dies; at least one of the die opposing plates being selectively, reciprocally movable between a closed position, adjacent the opposing stripping die, and an open position, spaced apart from the opposing stripping die; the hook slot penetrating each of the pair of opposing stripping dies, such that a portion of the hook slot is formed into each of the pair of opposing stripping dies; the portions of hook slot aligning with one another when the opposing stripping dies are in the closed position; at least one of the portions of the hook slot in at least one of the opposing stripping dies including a peripheral edge portion having at least one bead engagement edge that is removably coupled with the forward surface of the at least one of the opposing stripping dies; the at least one bead engagement edge including a corner portion that is shaped and positioned to engage portions of tire beads that pass through the opposing stripping dies and strip tire material from the tire beads;

the stripping die positioned generally transverse to the long axis of the elongated hook arm so that at least a portion of the elongated hook arm passes through the hook slot when the elongated hook arm is moved between the extended and retracted positions.

2. The system of claim 1 wherein the opposing stripping dies each include peripheral edge portions, which oppose one another when the opposing stripping dies are in the closed position, having bead engagement edges that are removably coupled with the forward surfaces of the opposing stripping dies.

3. The system of claim 1 further comprising:
at least one stripper bar coupled to a forward surface of at least one of the opposing stripping dies, between a peripheral edge portion of the at least one opposing stripping die and the hook slot; the at least one stripper bar having a length, a thickness, and a bead engagement edge portion that is faced toward the hook slot.

4. The system of claim 1 further comprising:
a bead crane having a boom arm that is operatively, pivotably coupled with the support frame, adjacent the elongated hook arm; the bead crane having a bead grapple disposed at a distal end portion of the boom arm that is selectively moveable between open and closed positions.

5. The system of claim 1 further comprising:
a base frame, the support frame operatively coupled with the base frame;
a tire lift coupled with the base frame, the tire lift comprising:
  a tire cage having opposing arm members that are selectively, pivotably movable with respect to one another, between gripping and releasing positions; the tire cage having a tire receiving void between the opposing arm members that is sized to securely receive a tire.

6. The system of claim 5 wherein the opposing arm members are arcuately shaped so that, together, they approximate at least a semi-circular configuration.

7. A system for removing beads from tires, the system comprising:
a support frame;
an elongated hook arm having a forward end portion, a rearward end portion, and a long axis that extends between the forward end portion and rearward end portion; the forward end portion having a hook that bends toward the rearward end portion; the elongated hook arm being operatively coupled with the support frame in a manner that permits selective reciprocal movement of the elongated hook arm along its long axis, between extended and retracted positions;

a pair of separate, opposing stripping dies disposed in a common plane, operatively coupled with the support frame; the stripping dies having forward surfaces, rearward surfaces, and a hook slot that penetrates the stripping dies; the hook slot being shaped to allow at least a portion of the elongated hook arm to pass through the stripping dies; at least one of the die opposing plates being selectively, reciprocally movable between a closed position, adjacent the opposing stripping die, and an open position, spaced apart from the opposing stripping die;

the stripping die positioned generally transverse to the long axis of the elongated hook arm so that at least a portion of the elongated hook arm passes through the hook slot when the elongated hook arm is moved between the extended and retracted positions; and a first stripper bar and a second stripper bar each coupled to a forward surface of at least one of the opposing stripping dies, between a peripheral edge portion of the at least one opposing stripping die and the hook slot;
the hook slot being disposed between the first stripper bar and second stripper bar;
the first stripper bar and second stripper bar each having a thickness, and a bead engagement edge portion that is faced toward the hook slot;
the thickness of the first stripper bar and second stripper bar positioning the bead engagement edge portions in a spaced-apart relationship with the forward surface of the at least one opposing stripping die.

8. The system of claim 7 wherein the bead engagement edge portions are removably coupled with the first stripper bar and second stripper bar.

9. The system of claim 7 wherein the first stripper bar and second stripper bar are each secured to one of the opposing side stripping dies such that lengths of the first stripper bar and second stripper bar extend over the forward surface of the opposing stripping die when the opposing stripping dies are in the open or closed positions.

10. A system for removing beads from tires, the system comprising:
a support frame;
an elongated hook arm having a forward end portion, a rearward end portion, and a long axis that extends between the forward end portion and rearward end portion; the forward end portion having a hook that bends toward the rearward end portion; the elongated hook arm being operatively coupled with the support frame in a manner that permits selective reciprocal movement of the elongated hook arm along its long axis, between extended and retracted positions;
at least one generally planar stripping die operatively coupled with the support frame and having a forward surface, a rearward surface, and a hook slot that penetrates the stripping die;
the hook slot being shaped to allow at least a portion of the elongated hook arm to pass through the stripping die;
the stripping die positioned generally transverse to the long axis of the elongated hook arm so that at least a portion of the elongated hook arm passes through the hook slot when the elongated hook arm is moved between the extended and retracted positions; and
a shear positioned adjacent the hook slot in the at least one stripping die; the shear having at least one cutting surface that is selectively movable in a cutting direction between open and closed positions.

11. The system of claim 10 wherein the shear is positioned adjacent the rearward surface of the at least one stripping die.

12. A system for removing beads from tires, the system comprising:
a support frame;
an elongated hook arm having a forward end portion, a rearward end portion, and a long axis that extends between the forward end portion and rearward end portion; the forward end portion having a hook that bends toward the rearward end portion; the elongated hook arm being operatively coupled with the support frame in a manner that permits selective reciprocal movement of the elongated hook arm along its long axis, between extended and retracted positions;
at least one generally planar stripping die operatively coupled with the support frame and having a forward surface, a rearward surface, and a hook slot that penetrates the stripping die; the hook slot being shaped to allow at least a portion of the elongated hook arm to pass through the stripping die;
the stripping die positioned generally transverse to the long axis of the elongated hook arm so that at least a portion of the elongated hook arm passes through the hook slot when the elongated hook arm is moved between the extended and retracted positions;
a base frame, the support frame operatively coupled with the base frame;
a tire lift coupled with the base frame, the tire lift comprising:
a tire cage having opposing arm members that are selectively, pivotably movable with respect to one another, between gripping and releasing positions; the tire cage having a tire receiving void between the opposing arm members that is sized to securely receive a tire; and
a tire receiving platform adjacent the tire cage; the tire platform being shaped and positioned with respect to the tire cage to support a side portion of a tire while the tire is disposed within the tire cage; a length of the tire platform extending parallel to a plane in which the opposing arm members pivot.

13. The system of claim 12 wherein the tire lift is pivotably coupled with the support frame, such that it is selectively moveable between a generally horizontal receiving position and a generally upright cutting position.

14. The system of claim 13 wherein the tire lift is positioned to dispose a side portion of a tire in the cutting position, closely adjacent the at least one stripping die and within a pathway of the elongated hook arm as the elongated hook arm is moved between the extended and retracted positions.

15. A system for removing beads from tires, the system comprising:
a support frame;
an elongated hook arm having a forward end portion, a rearward end portion, and a long axis that extends between the forward end portion and rearward end portion; the forward end portion having a hook that bends toward the rearward end portion; the elongated hook arm being operatively coupled with the support frame in a manner that permits selective reciprocal movement of the elongated hook arm along its long axis, between extended and retracted positions;
at least one generally planar stripping die operatively coupled with the support frame and having a forward surface, a rearward surface, and a hook slot that penetrates the stripping die; the hook slot being shaped to allow at least a portion of the elongated hook arm to pass through the stripping die;
the stripping die positioned generally transverse to the long axis of the elongated hook arm so that at least a portion of the elongated hook arm passes through the hook slot when the elongated hook arm is moved between the extended and retracted positions; and
a base frame;
the support frame coupled with the base frame with at least one lifting arm having first and second opposite end portions; the first end portion of the at least one lifting arm being pivotably coupled with the support frame and the second end portion of the at least one lifting arm being pivotably coupled with the base frame such that at least a forward end portion of the support frame is selectively, vertically moveable with respect to the base frame between upper and lower positions.

16. The system of claim 15 wherein the support frame is coupled with the base frame by at least one lower lifting arm and at least one upper lifting arm that are each pivotably coupled with the support frame and the base frame; the at least one lower lifting arm and at least one upper lifting arm being positioned with respect to one another, the support frame, and the base frame, such that the support frame remains generally horizontal between the upper and lower positions.

17. A system for removing beads from tires, the system comprising:
a base frame;
a support frame; the support frame coupled with the base frame with at least one lifting arm having first and second opposite end portions; the first end portion of the at least one lifting arm being pivotably coupled with the support frame and the second end portion of the at least one lifting arm being pivotably coupled with the base frame such that at least a forward end portion of the support frame is selectively, vertically moveable with respect to the base frame between upper and lower positions;
an elongated hook arm having a forward end portion, a rearward end portion, and a long axis that extends between the forward end portion and rearward end portion; the forward end portion having a hook that bends toward the rearward end portion; the elongated hook arm being operatively coupled with the support frame in a manner that permits selective reciprocal movement of the elongated hook arm along its long axis, between extended and retracted positions;
a pair of separate, opposing stripping dies disposed in a common plane; at least one of the die opposing plates being selectively, reciprocally movable between a closed position, adjacent the opposing stripping die, and an open position, spaced apart from the opposing stripping die; a hook slot penetrating the opposing stripping dies; the hook slot being shaped to allow at least a portion of the elongated hook arm to pass through the stripping die;
the opposing stripping dies positioned within a plane that is generally transverse to the long axis of the elongated hook arm so that at least a portion of the elongated hook arm passes through the hook slot when the elongated hook arm is moved between the extended and retracted positions; and
a tire lift pivotably coupled with the base frame and movable between a generally horizontal receiving position and a generally upright cutting position; the tire lift including a tire cage having opposing arm members that are selectively, pivotably movable with respect to one another, between gripping and releasing positions; the tire cage having a tire receiving void between the opposing arm members that is sized to securely receive a tire.

18. A method of removing beads from tires, the method comprising:

positioning a tire so that a sidewall of the tire is closely adjacent a forward surface of at least one generally planar stripping die; the at least one stripping die having a hook slot that penetrates the stripping die; at least one portion of the hook slot including a peripheral edge portion having at least one bead engagement edge that is removably coupled with a forward surface of the at least one stripping die; the at least one bead engagement edge including a corner portion that is shaped and positioned to engage portions of tire beads that pass through the opposing stripping dies and strip tire material from the tire beads;

positioning a hook end portion of an elongated hook arm closely adjacent a bead of the tire, wherein the bead of the tire is disposed between the hook end portion of the elongated hook arm and the at least one stripping die; and withdrawing the elongated hook arm through a hook slot that penetrates the at least one stripping die such that the hook end portion engages the tire bead and pulls the tire bead in a manner that engages the corner portion of the bead engagement edge and past a rearward surface of the at least one stripping die while a substantial portion of the tire remains adjacent the forward surface of the at least one stripping die.

19. The method of claim 18, prior to the step of positioning a tire, further comprising:

receiving a tire between opposing arm members of a tire cage; and moving the opposing arm members into a gripping position that engages the tire in a secure position.

20. The method of claim 19 wherein:

the tire cage received the tire in a receiving position where the opposing arm members pivot toward and away from one another along a horizontally disposed plane; and the step of positioning a tire so that a sidewall of the tire is closely adjacent a forward surface of at least one generally planar stripping die is performed by moving the tire cage from the receiving position to a generally upright position.

21. The method of claim 18, subsequent to the step of positioning a tire, further comprising:

elevating at least a portion of a support frame, to which the at least one stripping die and elongated hook arm are operatively coupled, to substantially align the hook slot with a central opening that penetrates the tire.

22. A method of removing beads from tires, the method comprising:

positioning a tire so that a sidewall of the tire is closely adjacent a forward surface of at least one generally planar stripping die; the at least one stripping die having a hook slot that penetrates the stripping die;

positioning a hook end portion of an elongated hook arm closely adjacent a bead of the tire, wherein the bead of the tire is disposed between the hook end portion of the elongated hook arm and the at least one stripping die;

moving a shear, positioned adjacent the hook slot in the at least one stripping die, in a cutting direction, such that a remainder of tire material is severed from the tire bead; and withdrawing the elongated hook arm through a hook slot that penetrates the at least one stripping die such that the hook end portion engages the tire bead and pulls the tire bead past a rearward surface of the at least one stripping die while a substantial portion of the tire remains adjacent the forward surface of the at least one stripping die.

23. A method of removing beads from tires, the method comprising:

positioning a tire so that a sidewall of the tire is closely adjacent a forward surface of at least one generally planar stripping die; the at least one stripping die having a hook slot that penetrates the stripping die;

positioning a hook end portion of an elongated hook arm closely adjacent a bead of the tire, wherein the bead of the tire is disposed between the hook end portion of the elongated hook arm and the at least one stripping die; and securing a portion of the tire bead within a bead grapple disposed at the end of a bead crane having a boom arm that is operatively, pivotably coupled with a support frame associated with the at least one stripping die and the elongated hook arm; and moving the bead crane such that the tire bead is moved away from the hook arm and at least one stripping die;

withdrawing the elongated hook arm through a hook slot that penetrates the at least one stripping die such that the hook end portion engages the tire bead and pulls the tire bead past a rearward surface of the at least one stripping die while a substantial portion of the tire remains adjacent the forward surface of the at least one stripping die.

* * * * *